US006637168B2

(12) United States Patent
Satomi et al.

(10) Patent No.: US 6,637,168 B2
(45) Date of Patent: Oct. 28, 2003

(54) AIRCRAFT ENGINE RUN-UP HANGAR

(75) Inventors: Takayuki Satomi, Kasukabe (JP); Kazushi Ogawa, Himeji (JP); Takashi Kawashima, Akashi (JP); Hidenori Yoshida, Kobe (JP); Yasuo Saito, Suita (JP); Hajime Hirakawa, Kobe (JP); Kazuyuki Akimoto, Matsudo (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 20 days.

(21) Appl. No.: 10/114,155

(22) Filed: Apr. 3, 2002

(65) Prior Publication Data

US 2002/0144473 A1 Oct. 10, 2002

(30) Foreign Application Priority Data

| Apr. 9, 2001 | (JP) | ................................. 2001-109911 |
| Oct. 15, 2001 | (JP) | ................................. 2001-317008 |

(51) Int. Cl.[7] .............................................. E04F 17/08
(52) U.S. Cl. ..................... 52/302.1; 52/174; 52/198; 454/262; 454/906; 454/237; 454/241; 454/242
(58) Field of Search ........................ 52/173.1, 144, 52/174, 302.1, 198; 454/262, 906, 237, 241, 242

(56) References Cited

U.S. PATENT DOCUMENTS

| 1,780,102 A | * | 10/1930 | Watt | ............................. 52/200 |
| 5,495,754 A | * | 3/1996 | Starr et al. | ...................... 73/147 |
| 6,023,890 A | * | 2/2000 | Zenobi | ............................. 52/64 |
| 6,139,439 A | * | 10/2000 | Ure | ............................... 472/136 |
| 6,155,003 A | * | 12/2000 | Smith | ............................. 52/65 |
| 6,279,855 B1 | * | 8/2001 | Domer | ....................... 244/114 R |

FOREIGN PATENT DOCUMENTS

| JP | A 2000-313399 | 11/2000 |
| JP | A 2000-318696 | 11/2000 |

* cited by examiner

Primary Examiner—Carl D. Friedman
Assistant Examiner—Nahid Amiri
(74) Attorney, Agent, or Firm—Oliff & Berridge, PLC

(57) ABSTRACT

An aircraft engine run-up hangar comprises a building defining a test chamber capable of receiving an aircraft therein, an air inlet structure, and an exhaust structure. The air inlet structure is formed in a front end part of a roof structure corresponding to a front end part of the building, the exhaust structure is connected to a rear end part of the building and defines an exhaust passage extending obliquely upward from the back end of the building, and one or a plurality of current deflecting members are disposed near a lower end of the air inlet structure to deflect air currents flowing through the air inlet structure into the building toward an aircraft housed in the building. A current-straightening structure is incorporated into the air inlet structure. A current-straightening space is defined under the air inlet structure. A first current-straightening member, a second current-straightening member, a third current-straightening member and a fourth current-straightening member are disposed in a region in and around the current-straightening space.

26 Claims, 19 Drawing Sheets

| HEIGHT (m) | MODEL NAME | TOTAL PRESSURE REDUCTION RATIO |
|---|---|---|
| 0.0 | FEN4 | 1.00 |
| 2.0 | FEN3 | 0.96 |
| 3.5 | FEN2 | 0.88 |

WALLS OF THE WIND GUARD STRUCTURE :
TWO- LAYER STRUCTURE OF METAL NETS ($\phi$ =70%)

| MATERIAL | MODEL NAME | OPEN-AREA RATIO (%) | TOTAL PRESSURE REDUCTION RATIO |
|---|---|---|---|
| NOT USED | | 100 | 1.000 |
| METAL NET ($\phi$=70%), SINGLE - LAYER STRUCTURE | FEN6-30 | 70 | 0.763 |
| METAL NET ($\phi$=70%), DOUBLE - LAYER STRUCTURE | FEN6 | 50 | 0.807 |
| METAL NET ($\phi$=70%), TRIPLE - LAYER STRUCTURE | FEN6-70 | 30 | 0.815 |

| SECOND CURRENT-STRAIGHTENING MEMBER | MODEL NAME | INTENSITY OF DISTURBANCE (%) | | RESISTANCE COEFFICIENT |
|---|---|---|---|---|
| | | AXIAL FLOW | VERTICAL FLOW | |
| NOT USED | Z1 | 5.8 | 6.4 | 0.0 |
| METAL NET ($\phi$=70%) | | 3.3 | 4.0 | 0.65 |
| METAL NET ($\phi$=70%), DOUBLE LAYER STRUCTURE | Z1-h | 1.8 | 1.9 | 1.3 |
| METAL NET ($\phi$=50%) | Z1-h50 | 1.9 | 1.9 | 2.5 |
| | | | | |
| PERFORATED PLATE ($\phi$=50%) | Z1-hp50 | 3.0 | 3.2 | |
| PERFORATED PLATE ($\phi$=30%) | Z1-hp70 | 5.6 | 6.9 | |

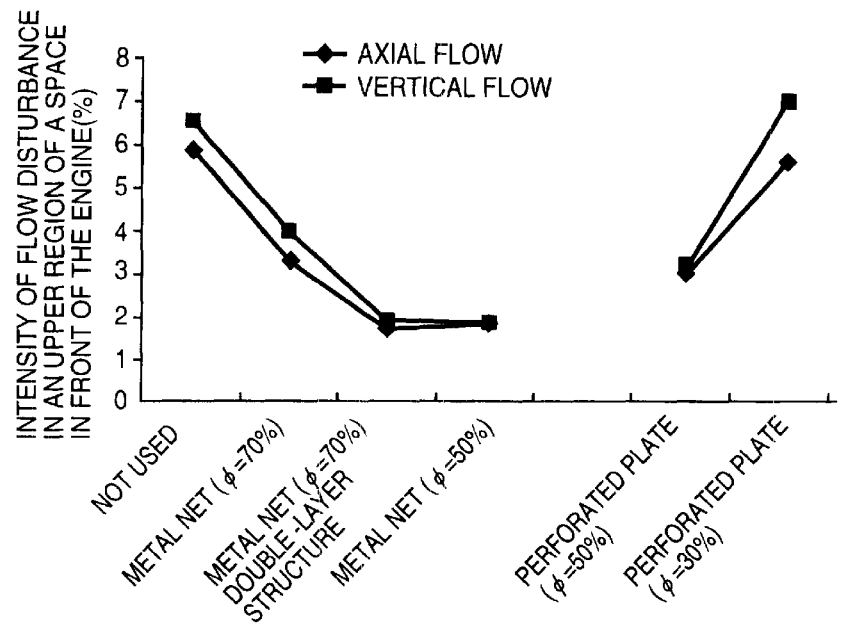
FIG.15
| POSITION (LONGITUDINAL) | b | TOTAL PRESSURE REDUCTION RATION | TOTAL PRESSURE REDUCTION (mmHg) |
|---|---|---|---|
| 0-th ROW FROM THE BACK | 0 | 1.00 | 2.44 |
| FIRST ROW FROM THE BACK | 1/7 | 0.98 | 2.40 |
| SECOND ROW FROM THE BACK | 2/7 | 0.78 | 1.91 |
| THIRD ROW FROM THE BACK | 3/7 | 0.90 | 2.19 |
FIG.16
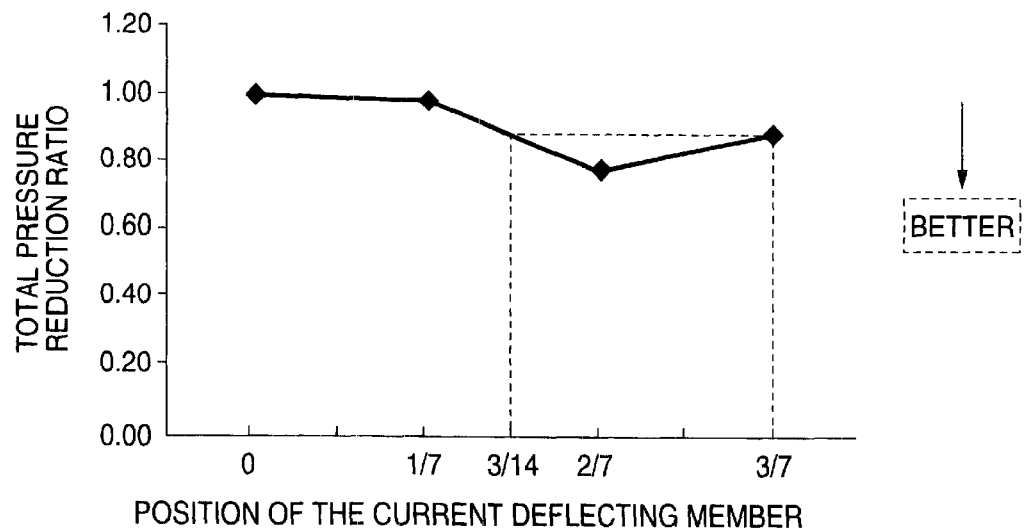
FIG.17

AIRCRAFT ENGINE RUN-UP HANGAR

BACKGROUND OF THE INVENTION

1. Field of the Invention

The present invention relates to an aircraft engine run-up hangar and, more specifically, to an aircraft engine run-up hangar having an improved air inlet structure through which fresh air is taken into a test chamber, an improved current-straightening structure disposed near the air inlet structure, and an improved exhaust structure through which gases are discharged from the test chamber, and capable of producing stable air currents in the test chamber.

2. Description of the Related Art

An overhauled aircraft engine or an aircraft engine of an aircraft to be placed in commission is subjected to a ground run-up in an open space for performance test. Various noise control measures have been taken for environmental protection. Generally, a noise-suppressing duct is disposed just behind the exhaust cone of the engine for outdoor run-up. Some recent run-up method uses a building capable of entirely housing an aircraft therein and having a noise control function, which is called a noise control hangar. Generally, an air inlet structure included in a noise control hangar is incorporated into the front end part of the noise control hangar to take air into the noise control hangar. Such a noise control hangar of a front air inlet type is provided with a big door provided with an inlet structure having current-straightening and noise control functions at its front end. This big door must be opened when carrying an aircraft into or out of the noise control hangar. The air inlet structure having current-straightening and noise control functions is inevitably long and, consequently, the big door provided with the long air inlet structure is inevitably very thick. The thickness of a big door included in a practical noise control hangar of a front inlet type is as big as 7.5 m.

Operations for opening and closing the big door provided with the air inlet structure and having a big thickness to carry an aircraft into or out of the noise control hangar need a large-scale door operating mechanism, and a large operating space is necessary for moving and storing the big door provided with the air inlet structure. Thus, the thick big door and the large operating space increase equipment costs. Moreover, the air inlet structure provides a large intake resistance and hence the back flow of exhaust gas is liable to occur in the noise control hangar. If wind blows outside across a direction in which air flows into the air inlet, it is difficult to produce uniform air currents by straightening air taken in through the air inlet and hence it is difficult to carry out the run-up of the aircraft engine under proper run-up conditions.

A previously proposed noise control hangar is provided with an air inlet in a front end part of the roof structure of the noise control hangar instead of in the front end of the noise control hangar. A noise control hangar proposed in, for example, JP-A 318696/2000 is provided with an air inlet formed in a front end part of the roof structure of the noise control hangar corresponding to the front end part of the noise control hangar, and an exhaust duct to be connected to the exhaust port of an aircraft engine and placed in the test chamber defined by the noise control hangar. Exhaust gas discharged from the aircraft engine is discharged outside through an exhaust line arranged in a back end part of the noise control hangar during the run-up of the aircraft engine. The exhaust duct must be moved every time aircrafts are changed and much labor is necessary for moving the exhaust duct. A noise control hangar disclosed in JP-A 313399/2000 has a roof structure provided with an inlet opening in a front end part thereof corresponding to the front end part of the noise control hangar, and is provided with an exhaust line extending backward and upward from the back end of a test chamber, and circulation-preventive plates having a J-shaped cross section disposed on a part of a ceiling in a back part of the test chamber to prevent the circulation of the exhaust gas.

In the prior art noise control hangar disclosed in JP-A 318696/2000, air currents flowing through the air inlet formed in the roof structure into the test chamber impinge on the floor of the test chamber and then flow backward. Thus, the downward air currents flowing through the air inlet into the test chamber cannot be regularly deflected so as to flow backward toward the aircraft and most part of the air currents is liable to produce eddies and turbulent flows, making it difficult to carry out run-up under proper run-up conditions.

Since the height of the vertical tail fin of an aircraft is greater than that of main wings holding wing engines, the height of the ceiling of a noise control hangar must be greater than that of the vertical tail fin. In such a noise control hangar, the exhaust gas discharged backward from the engine tends to flow forward through an upper region of a space defined by the noise control hangar and hence the exhaust gas is liable to be sucked into the engine, which makes it difficult to carryout the run-up of the engine under proper run-up conditions.

The noise control hangar disclosed in JP-A 313399/2000 has the air inlet formed in the front end part of the roof structure and provided with a current-straightening structure including a plurality of vertical plates longitudinally arranged at predetermined intervals. This noise control hangar has the following problems because any other current-straightening means is not disposed near the air inlet. The upper end of the air inlet is exposed on the roof structure to enable fresh air to flow directly into the air inlet. Under a stormy condition, air is unable to flow uniformly through the air inlet, eddies are liable to be produced in air currents and air currents are liable to be disturbed. Since the current-straightening structure disposed at the air inlet includes the plurality of plates, eddies and turbulence are liable to remain in the air currents below the current-straightening structure.

SUMMARY OF THE INVENTION

Accordingly, it is an object of the present invention to provide an aircraft engine run-up hangar including a building defining a test chamber and having a roof structure provided with an air inlet, capable of deflecting air currents flowing through the air inlet into the building toward an aircraft housed in the building and of satisfactorily straightening air currents flowing through the air inlet into the building, and not requiring any exhaust duct in a test chamber defined by the building.

According to the present invention, an aircraft engine run-up hangar includes: a building defining a test chamber capable of receiving an aircraft therein; an air inlet structure; and an exhaust structure; wherein the air inlet structure is formed in a front end part of a roof structure corresponding to a front end part of the building, the exhaust structure is connected to a rear end part of the building and defines an exhaust passage extending obliquely upward from the back end of the building, and one or a plurality of current deflecting members are disposed near a lower end of the air inlet structure to deflect air currents flowing through the air inlet structure into the building toward an aircraft housed in the building.

The air inlet structure is disposed on the roof structure and hence a large door for closing a large opening through which the aircraft is carried into or out of the building does not need to be provided with any air inlet structure, and the large door may be of simple construction similar to that of an ordinary soundproof door. Therefore any space for moving and storing the large door is not necessary, which is favorable to saving space necessary for installing the aircraft engine run-up hangar and is convenient in incorporating various current-straightening means into the air inlet structure. Since the air inlet structure is disposed on the front end part of the roof structure corresponding to the front end part of the building, air currents introduced through the air inlet structure into the test chamber tend to flow vertically downward, to impinge on the floor of the test chamber, to be disturbed and to induce reverse currents in the test chamber. However, the one or the plurality of current deflecting members disposed near the lower end of the air inlet structure deflect the air currents so that the air currents flow substantially horizontally toward the aircraft and do not impinge on the floor of the test chamber. Thus, scarcely disturbed, scarcely swirling stable air currents flow into the engine of the aircraft to ensure proper run-up conditions.

Since the exhaust structure is connected to the rear end part of the building so as to form the exhaust passage extending obliquely upward from the back end of the building, any work for moving an exhaust duct is not necessary when aircrafts are changed. Since air in the test chamber is discharged upward through the back end part of the building, the exhaust structure has a comparatively short length and needs a comparatively small space for installation behind the building, which is favorable to saving space necessary for installing the aircraft engine run-up hangar.

Preferably, the aircraft engine run-up hangar further includes an air-permeable wind guard structure rising from the roof structure of the building and surrounding the air inlet of the air inlet structure. The wind guard structure reduces the effect of wind and wind direction on the air currents flowing through the air inlet structure into the test chamber and makes uniform the distribution of velocities of the air currents in the entire region of the air passage in the air inlet structure.

Preferably, the air inlet structure is provided with a current-straightening structure provided with a plurality of plates arranged in a grid or a honeycomb so as to define vertical current-straightening passages. Thus, the air currents are straightened so as to flow regularly downward. When the plurality of plates arranged in a grid or a honeycomb of the current-straightening structure are formed of a sound-absorbing material, run-up noise emitted by the engine during run-up in the building can be controlled by the current-straightening structure and emission of noise through the air inlet structure of the building can be reduced. Since the current-straightening structure incorporated into the air inlet structure opens upward, the run-up noise diffuses upward into the atmosphere and the level of the run-up noise propagating around the building can be reduced.

Preferably, a first current-straightening member is disposed at the lower end of the current-straightening structure. The first current-straightening member straightens the air currents still further.

Preferably, a current-straightening space of a predetermined height is formed under the current-straightening structure in a region below the current deflecting member or members, and a second current-straightening member is disposed in a lower end part of the current-straightening space. Air currents flowing at different velocities below the plurality of plates of the current-straightening structure can be uniformed and small eddies produced in the air currents can be eliminated in the current-straightening space.

Preferably, a plurality of third current-straightening members are disposed vertically in the current-straightening space so as to extend in the direction of the air currents. The third current-straightening members promote the straightening of the air currents in the current-straightening space.

Preferably, the air inlet structure is disposed at a position on the front end part of the roof structure of the building corresponding to a position in front of the aircraft housed in the building. Thus, the air currents flowing through the air inlet structure into the building can be deflected by the current deflecting member so as to flow in a substantially horizontal direction toward the aircraft.

Preferably, the air inlet of the air inlet structure has a width nearly equal to the width of the front end part of the building. Thus, the air inlet structure has a large sectional area and hence air currents flow through the air inlet structure at low velocities. Consequently, air currents can be effectively straightened and the flow of the air currents in lateral directions in the building can be effectively suppressed.

Preferably, the one or the plurality of current deflecting members are plates having a substantially J-shaped cross section. Therefore, air currents on the back side of the current deflecting member or members are deflected backward by the guiding effect of the current deflecting member or members, and air currents on the front side of the current deflecting member or members are deflected backward by the Coanda effect.

Preferably, the one or the plurality of current deflecting members are plates having a substantially J-shaped cross section, and the current deflecting member or members are disposed in a region around a position at a distance equal to $3/14$ to $3/7$ of the length of the air inlet structure from the back end of the air inlet structure. Since an air passage part of a length in the range of about $3/14$ to $3/7$ of the length of the air inlet structure opens behind the current deflecting member or members, air currents flow on the front and the back side of the current deflecting member or members, and the current deflecting member or members exercise both the guiding action and the Coanda effect with reliability. The range $3/14$ to $3/7$ was determined empirically, which will be described later.

Preferably, a fourth current-straightening member is extended from a position near the lower end of the current deflecting member to a ceiling included in the building on the back side of the current deflecting member. The fourth current-straightening member straightens air currents flowing on the back side of the current deflecting member.

Preferably, the current deflecting member having the substantially J-shaped cross section is provided with one or a plurality of flaps. The flaps suppress the generation of eddies attributable to burble, which is liable to occur on the front side of the curved part of the current deflecting member.

Preferably, the plurality of current deflecting members are formed integrally with lower edge parts of a plurality of plates extended laterally in the current-straightening structure, respectively. The air currents straightened by the current-straightening structure can be effectively deflected.

Preferably, the plurality of current deflecting members comprise a plurality of guide members arranged at predetermined longitudinal intervals. Thus, the air currents straightened by the current-straightening structure can be effectively deflected.

Preferably, the plurality of guide members extend downward such that lower edges of the guide members nearer to the front end of the building are at lower levels. Thus, the deflected air currents will not be easily disturbed and the air currents are stabilized.

Preferably, a vertical tail fin passing gap that permits the vertical tail fin of an aircraft to pass when carrying the aircraft into or out of the building is formed in a middle part of each of the current deflecting members, and the vertical tail fin passing gap is covered with a movable cover. Thus, the covers are moved away from the vertical tail fin passing gaps to open the vertical tail fin passing gaps so that the vertical tail fin is able to pass through the vertical tail fin passing gaps and the aircraft can be carried into or out of the building even if the lower edges of the current deflecting members are at a level below that of the tip of the vertical tail fin. The vertical tail fin passing gaps are closed by covering the same with the covers during run-up to achieve the deflection of air currents without being affected by the vertical tail fin passing gaps.

Preferably, a pair of vertical current-straightening plates are disposed at the opposite ends of the vertical tail fin passing gap of each current deflecting member so as to extend longitudinally. The current-straightening plates reduce the swirling or turbulent flow of air at edges defining the vertical tail fin passing gap of each current deflecting member.

Preferably, the wind guard structure has an open-area ratio in the range of 50% to 75%. Thus, the wind guard structure provides a low resistance against the passage of air currents and exercises a satisfactory protective function against wind.

Preferably, the wind guard structure has a mean height of 2.0 m or above. The wind guard structure exercises a satisfactory protective function against wind.

Preferably, an air-permeable, upper wind guard is disposed on the upper end of the wind guard structure at a level substantially equal to that of the upper end of the wind guard structure so as to cover the upper end of the air inlet structure. The upper wind guard reduces the effect of wind and wind direction on air currents flowing therethrough into the air inlet structure and uniforms the distribution of velocities of the air currents in the entire region of the air passage of the air inlet structure.

Preferably, the current-straightening structure is formed in a predetermined length with respect to the flowing direction of air. Thus, the current-straightening structure has a satisfactory current-straightening ability.

Preferably, the plates of the current-straightening structure are formed of a sound absorbing material. Thus, the current-straightening structure is capable of effectively absorbing run-up noise propagating outside from the building through the air inlet structure for silencing.

Preferably, the first current-straightening member is formed from a metal net, a textile net, a perforated plate, a slit plate or an expanded metal, and has an open-area ratio in the range of 40% to 70%. The first current-straightening member is simple in construction and is capable of exercising a current-straightening ability without exerting an excessive resistance on air currents.

Preferably, the second current-straightening member is formed from a metal net, a textile net, a perforated plate, a slit plate or an expanded metal. The second current-straightening member is simple in construction and is capable of exercising a current-straightening ability without exerting an excessive resistance on air currents.

Preferably, the third current-straightening member is formed from a metal net, a textile net, a perforated plate, a slit plate or an expanded metal. The third current-straightening member is simple in construction and is capable of exercising a current-straightening ability without exerting an excessive resistance on air currents.

Preferably, the fourth current-straightening member is formed from a metal net, a textile net, a perforated plate, a slit plate or an expanded metal. The fourth current-straightening member is simple in construction and is capable of exercising a current-straightening ability without exerting an excessive resistance on air currents.

BRIEF DESCRIPTION OF THE DRAWINGS

The above and other objects, features and advantages of the present invention will become more apparent from the following description taken in connection with the accompanying drawings, in which:

FIG. 15 is a graph showing the data tabulated in the table shown in FIG. 14;

FIG. 16 is a table showing data obtained through model experiments on the position of a current deflecting member;

FIG. 17 is a graph showing the data tabulated in the table shown in FIG. 16;

DESCRIPTION OF THE PREFERRED EMBODIMENTS

Figure 1:
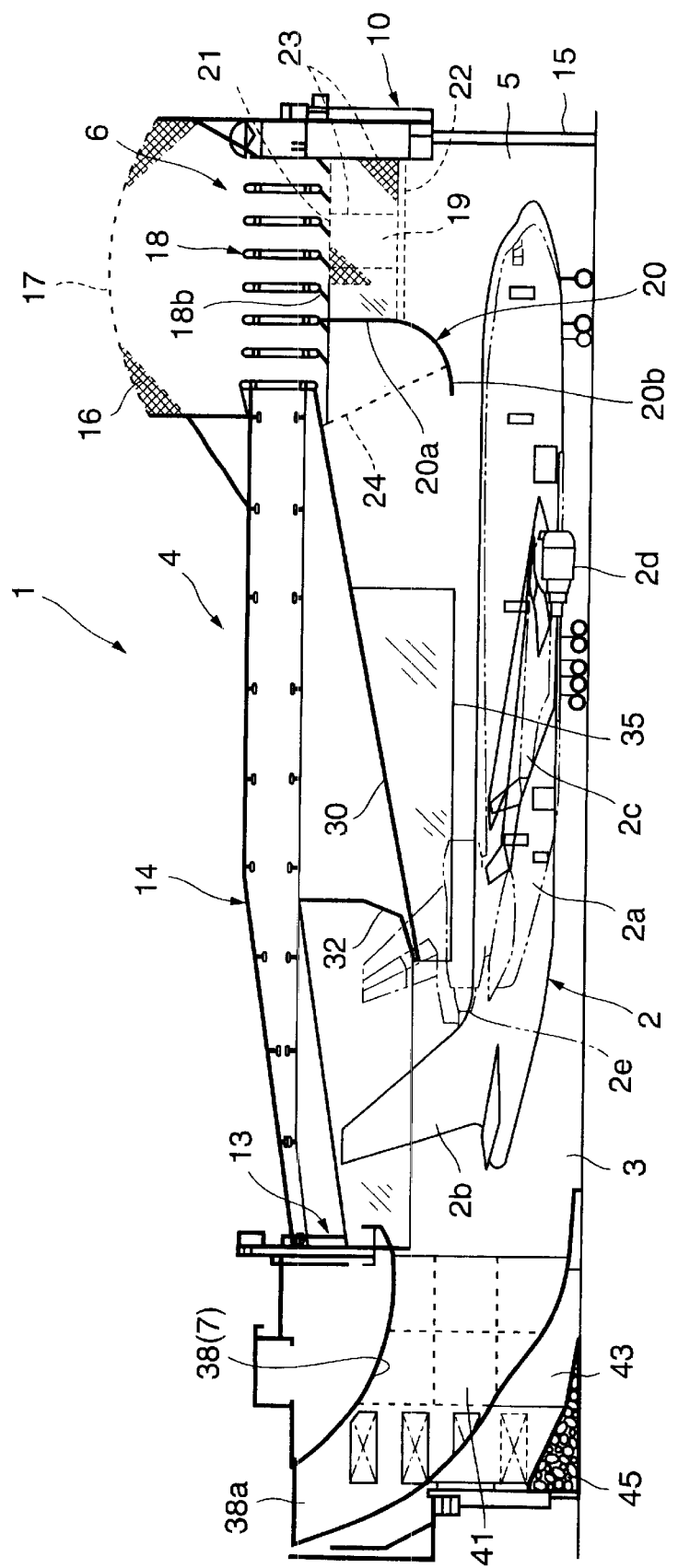
FIG. 1 is a schematic longitudinal sectional view of an aircraft engine run-up hangar in a preferred embodiment according to the present invention in a vertical plane including the longitudinal axis of the aircraft engine run-up hangar.

Referring to FIGS. 1 to 4, an aircraft engine run-up hangar 1 in a preferred embodiment according to the present invention includes a building 4 defining a test chamber 3 in which an aircraft is subjected to an aircraft engine run-up, an entrance structure 5 formed at the front end of the building 4, an air inlet structure 6 through which air is taken into the test chamber, and an exhaust structure 7 through which gases are exhausted from the test chamber 3. In the following description, words front, back, right, left and such are used for expressing directional and positional attributes as viewed facing the front end of the building 4.

Referring to FIGS. 1 to 9, the building 4 is a building of steel skeleton construction having a front end wall structure 10, a left side wall structure 11, a right side wall structure 12, a back end wall structure 13, and a roof structure 14. The entrance structure 5 extends over the entire width of the front structure 10 and is closed by a large door 15. The large door 15 has a left half door 15a and a right half door 15b. Each of the half doors 15a and 15b consists of a plurality of separate narrow door members supported on and guided by rails. Each of the half doors 15a and 15b may be formed by connecting narrow door members. The left half door 15a can be moved by a horizontal door moving device of a monorail type, not shown, between an open position beside the inner surface of the left side wall structure 11 and a closing position for closing the left half part of the entrance 5. Similarly, the right half door 15b can be moved by a horizontal door moving device of a monorail type, not shown, between an open position beside the inner surface of the right side wall structure 12 and a closing position for closing the right half part of the entrance 5.

The air inlet structure 6 is set on a part of the roof structure 14 in a front end part of the building 4. The air inlet structure 6 is isolated from the entrance 5. Air does not need to be taken into the building 4 through the entrance 5 when testing the engine of an aircraft 2 and hence the large door 15 is kept closed during the run-up of the engine. The large door 15 has a thickness approximately equal to that of an ordinary soundproof door. The large door 15 may be moved vertically for closing and opening by a vertical door operating mechanism. This large door 15 does not need any space for storing the half doors 15a and 15b in the opposite ends of the front end of the building 4, which is favorable to saving a space necessary for installing the aircraft engine run-up hangar 1.

As shown in FIGS. 1 to 4, the roof of the roof structure 14 of the building 4 is a gable roof sloping down in opposite lateral directions. The roof of the roof structure 14 may be a flat roof. The air inlet structure 6 is disposed in a front end part of the roof structure 14 and extends over the substantially entire width of the building 4. The air inlet structure 6 is disposed above a space in front of the aircraft housed in the building 4 for run-up. An air-permeable wind guard structure 16 is set on the roof structure 14 so as to surround the air inlet of the air inlet structure 6. The wind guard structure 16 reduces the adverse effects of wind, such as the variation of the direction and velocity of wind, and swirling or turbulent flow of air, on air currents flowing through the air inlet structure 6 into the test chamber 3. The wind guard structure 16 has a mean height of 2.0 m or above. Each of the walls of the wind guard structure 16 is a single- or a double-layer structure formed by putting together metal nets having an open-area ratio in the range of 50% to 75%. The walls of the wind guard structure 16 may be formed from a textile net, a perforated plate provided with many small holes, a slit plate provided with many small slits or an expanded metal. A top wind guard 17 is placed on the upper end of the wind guard structure 16 so as to cover the open upper end of the wind guard structure 16 at a level substantially the same as that of the upper end of the wind guard structure 16. The top wind guard 17 is a single-layer structure formed from a metal net having an open-area ratio in the range of 50% to 75% or a double-layer structure formed by putting together metal nets having an open-area ratio in the range of 50% to 75%. The top wind guard 17 may be formed from a textile net, a perforated plate provided with many small holes, a slit plate provided with many small slits or an expanded metal.

The air inlet structure 6 is provided with a current-straightening structure 18 having a predetermined height, i.e., a dimension along the flowing direction of air, in the range of, for example, 4 to 5 m. The current-straightening structure 18 is built by assembling a plurality of vertical plates 18a in a grid. Each of the plates 18a is a sound-absorbing panel formed by applying a sound-absorbing material to a corrugated steel plate having rectangular ridges and furrows. The current-straightening structure 18 has a current-straightening function to straighten air currents flowing down through the air inlet structure 6 and a noise suppressing function to suppress run-up noise generated in the building 4.

A first current-straightening member 21 is attached to the lower end of the current-straightening structure 18 so as to cover the lower end entirely. The first current-straightening member 21 is formed from a metal net or a textile net having an open-area ratio in the range of 40% to 70%. Flat guide members 18b formed by processing a steel plate and attached to the lower edges of the lateral plates of the current-straightening structure 18 are placed in a middle part with respect to the width of the upper surface of the first current-straightening member 21. The first current-straightening member 21 may be a perforated plate provided with many small holes, a slit plate provided with many small slits or an expanded metal.

A single current deflecting member 20 is fixed to the lower end of the current-straightening structure 18. The current deflecting member 20 has a predetermined height. A current-straightening space 19 of a predetermined height in the range of, for example, 4 to 5 m is defined under the current-straightening structure 18. A second current-straightening member 22 for straightening air currents flowing through the air inlet structure 6 into the building 4 is disposed so as to define the bottom of the current-straightening space 19. The second current-straightening member 22 is formed from a metal net or a textile net having an open-hole ratio in the range of 40% to 70%. The second current-straightening member 22 may be a perforated plate provided with many small holes, a slit plate provided with many small slits or an expanded metal.

A plurality of vertical third current-straightening members 23 are arranged in a grid in the current-straightening space 19 so as to define vertical passages for air currents. The third current-straightening members 23 are metal nets or textile nets having an open-hole ratio in the range of 40% to 70%. The third current-straightening members 23 may be perforated plates provided with many small holes, slit plates provided with many small slits or expanded metals. A fourth current straightening member 24 is disposed behind the current deflecting member 20 so as to extend between a position near a lower end part of the current deflecting member 20 to the ceiling of the building 4 to straighten air currents flowing through a back part of the air inlet structure 6 into the building 4. The fourth current straightening member 24 is formed from a metal net or a textile net having an open-area ratio in the range of 40 to 70%. The fourth current-straightening member 24 may be formed from a perforated plate provided with many small holes, a slit plate provided with many small slits or an expanded metal.

Figure 2:
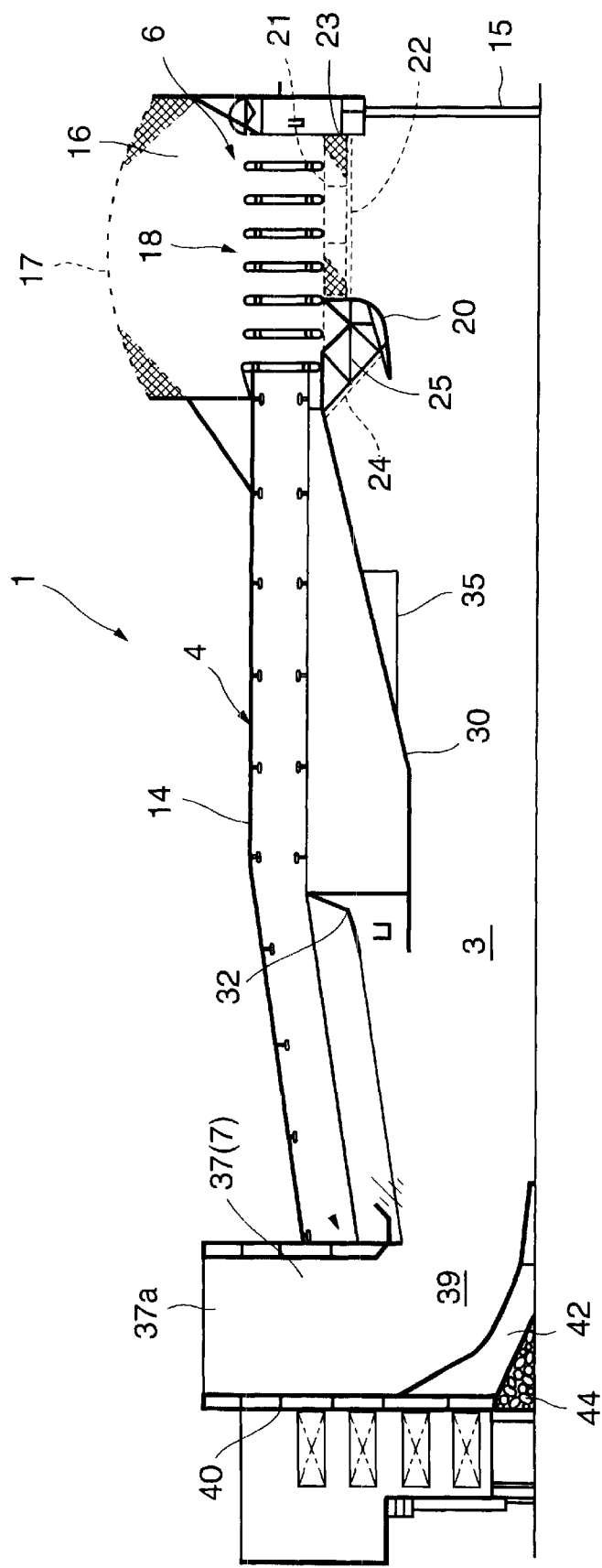
FIG. 2 is a schematic sectional view of the aircraft engine run-up hangar shown in FIG. 1 in a vertical plane not including the longitudinal axis of the aircraft engine run-up hangar.
Figure 3:
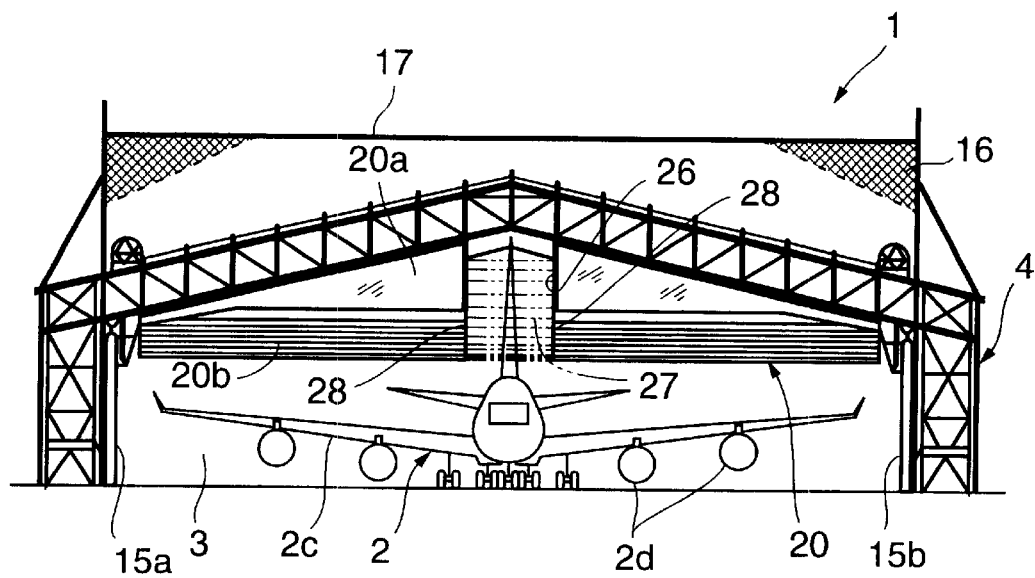
FIG. 3 is a cross-sectional view of the aircraft engine run-up hangar shown in FIG. 1.

The current deflecting member 20 will be described. As shown in FIGS. 1 to 3, the current deflecting member 20 deflects air currents flowing through the air inlet structure 6 into the building 4 and guides the same toward the aircraft 2. The current deflecting member 20 is a plate having a substantially J-shaped cross section and extending over the substantially entire width of the building 4. The current deflecting member 20 is disposed at or near a position at a distance in the range of 3/14 to 3/7 of the length of the air inlet structure 6 from the back end of the air inlet structure 6. The upper end of the current deflecting member 20 is fixed to the lower edge of the vertical plate 18a extending along the width of the current-straightening structure 18 and is held by a truss 25 connected to the roof structure 14 of the building 4.

The current deflecting member 20 has a vertical part 20a, and a horizontal part 20b extending horizontally forward. The horizontal part 20b is at a level somewhat higher than those of the fuselage 2a and the horizontal stabilizers of the largest one of aircrafts 2 that can be received in the test chamber 3 to avoid interference between the horizontal part 20b and the aircraft 2 when carrying the aircraft 2 into or out of the aircraft engine run-up hangar 1. The current deflecting member 20 may be disposed at any suitable position other than the aforesaid position. For example, the current deflecting member 20 may be disposed at a position at a distance in the range of about B/8 to B/2, where B is the length of the air inlet structure 6, from the back end of the air inlet structure 6. Lower parts of the vertical part 20a of the current deflecting member 20 may be inclined at suitable angles to a horizontal plane, and the horizontal part 20b may be slightly inclined.

As shown in FIG. 3, a vertical tail fin passing gap 26 that permits the vertical tail fin 2b of an aircraft 2 to pass when carrying the aircraft 2 into or out of the aircraft engine run-up hangar 1 is formed in a middle part, with respect to the width, of the current deflecting member 20, and the vertical tail fin passing gap 26 is closed by a cover 27. The cover 27 is a roll-up shutter that can be rolled up to open the vertical tail fin passing gap 26 by a driving device, not shown, held on the roof structure 14. The cover 27 is opened when carrying the aircraft 2 into or out of the aircraft engine run-up hangar 1, and is closed during run-up. The cover 27 may include a pair of sliding doors that can be moved in opposite directions, respectively by a driving device.

Figure 4:
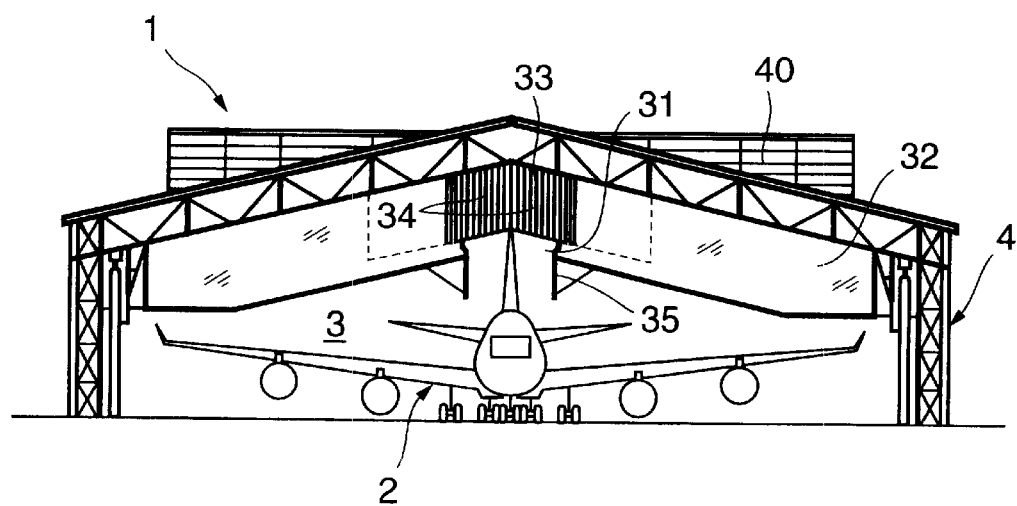
FIG. 4 is a cross-sectional view of the aircraft engine run-up hangar shown in FIG. 1.

As shown in FIGS. 1 and 2, most part of the ceiling of the building 4 is an inclined section 30. The inclined section 30 straightens air currents flowing through the test chamber to make accompanying currents accompanying the flow of an exhaust gas emitted from the engine of the aircraft 2 during run-up, and air around the accompanying currents to flow regularly toward the back of the test chamber 3. As shown in FIG. 4, a groove 31 is formed in a middle part, with respect to the width, of the inclined section 30 to allow the vertical tail fin 2b of the aircraft 2 to pass when the aircraft 2 is carried into or out of the test chamber 3. The opposite side walls of the groove 31 are formed of plates.

The inclined section 30 of the ceiling extends between a position near the back end of the air inlet structure 6 and a position in front of the vertical tail fin 2b of the aircraft 2 placed in the test chamber 3 and slopes down gently toward the back. The inclined section 30 has laterally opposite parts respectively extending on the opposite sides of the groove 31 and sloping down toward the right side wall structure 12 and the left side wall structure 11 in parallel to the roof of the roof structure 14. The flow of the accompanying currents decreases with distance from the groove 31. Therefore, the laterally opposite parts of the inclined section 30 are sloped down toward the right side wall structure 12 and the left side wall structure 11, respectively, to prevent the reduction of the velocity of the accompanying currents in the vicinity of the right side wall structure 12 and the left side wall structure 11.

Referring to FIGS. 1, 2 and 4, a reverse flow stopping plate 32 of a width approximately equal to that of the test chamber 3 is suspended from the ceiling of the test chamber 3 so as to extend in front of the vertical tail fin 2b of the aircraft 2 placed in the test chamber 3. The reverse flow stopping plate 32 has a J-shaped cross section and is disposed at a position at or near the back end of the inclined section 30. The upper end of the reverse flow stopping plate 32 is fixed to the roof structure 14 and the lower end of the same is fixed to the back end of the inclined section 30 of the ceiling. A vertical tail fin passing gap 33 which allows the passage of the vertical tail fin 2b when carrying the aircraft 2 into or out of the aircraft engine run-up hangar 1 is formed in a middle part, with respect to width, of the reverse flow stopping plate 32. The vertical tail fin passing gap 33 can be closed or opened by laterally moving a pair of covers 34, i.e., doors, by a driving device, not shown. The vertical tail fin passing gap 33 is opened when the aircraft is carried into or out of the aircraft engine run-up hangar 1, and is kept closed during run-up. A roll-up shutter that can be rolled up may be used instead of the pair of covers 34.

A pair of current-straightening plates 35 are extended down from the opposite side walls of the groove 31 to straighten air currents flowing toward a tail engine 2e. The current-straightening plates 35 may be metal nets, textile nets, perforated plates provided with many small holes, slit plates provided with many small slits or expanded metals.

Figure 5:
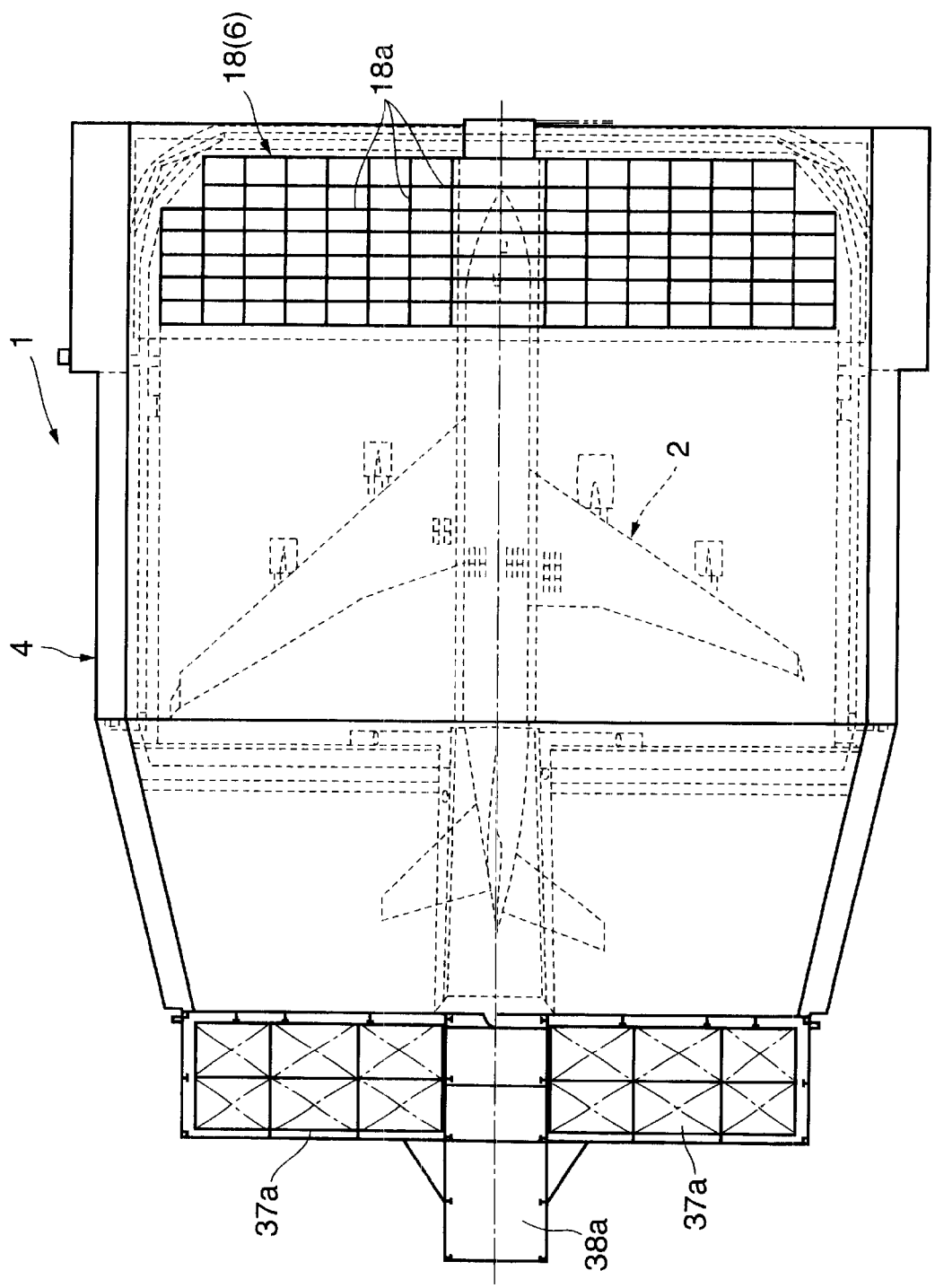
FIG. 5 is a plan view of the aircraft engine run-up hangar shown in FIG. 1.
Figure 6:
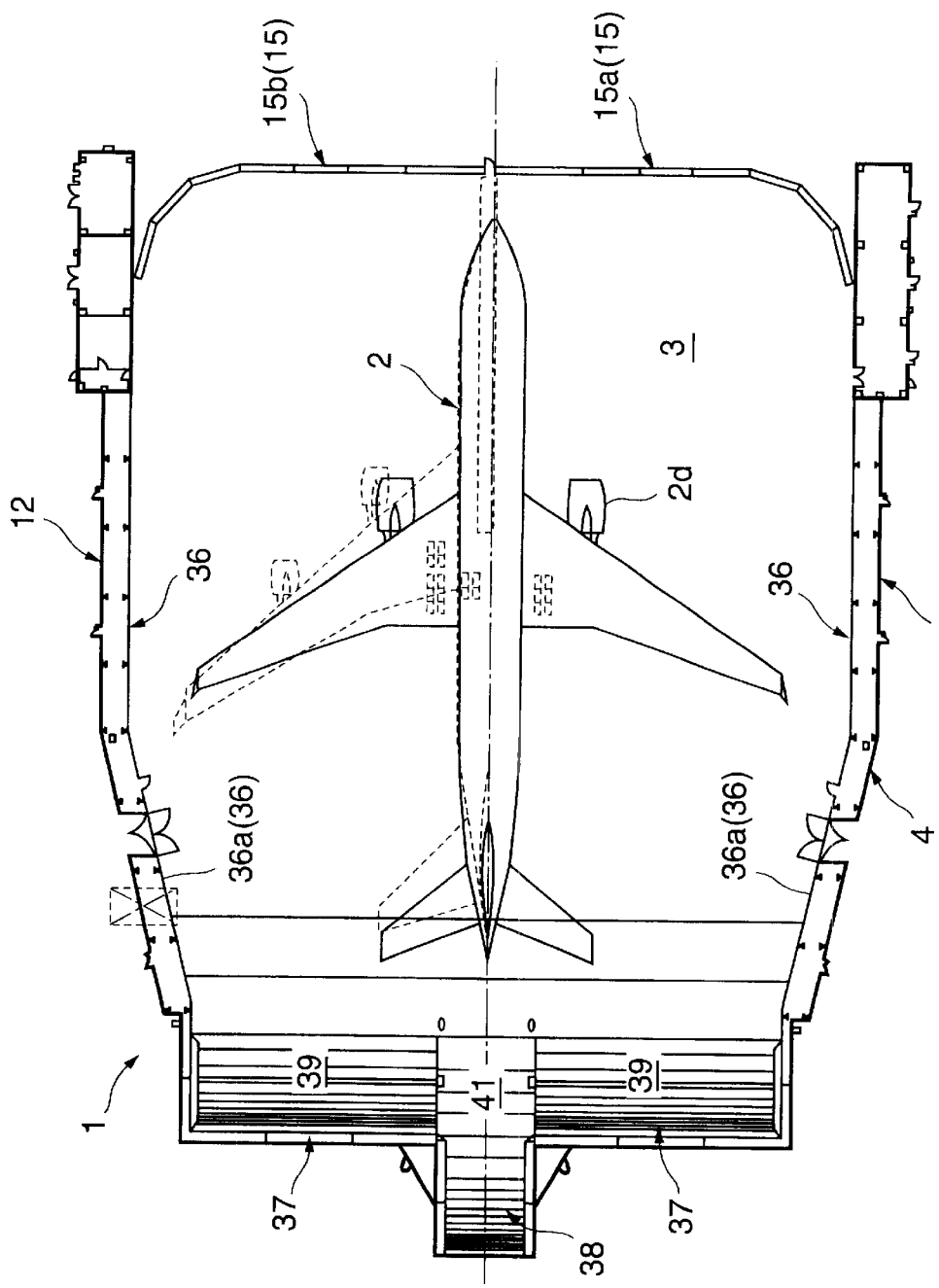
FIG. 6 is a sectional view of the aircraft engine run-up hangar shown in FIG. 1 in a horizontal plane.
Figure 7:
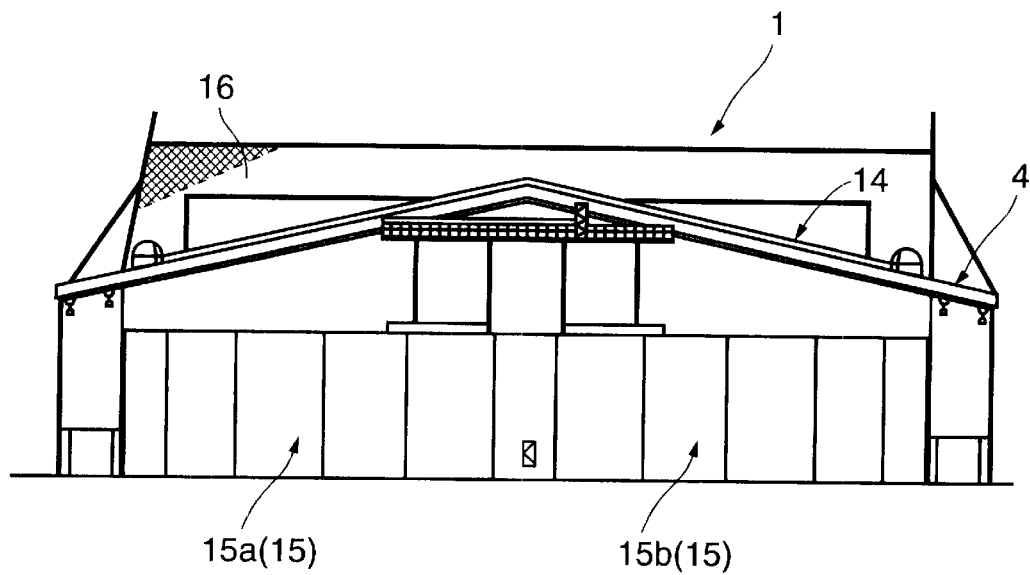
FIG. 7 is a front elevation of the aircraft engine run-up hangar shown in FIG. 1.
Figure 8:
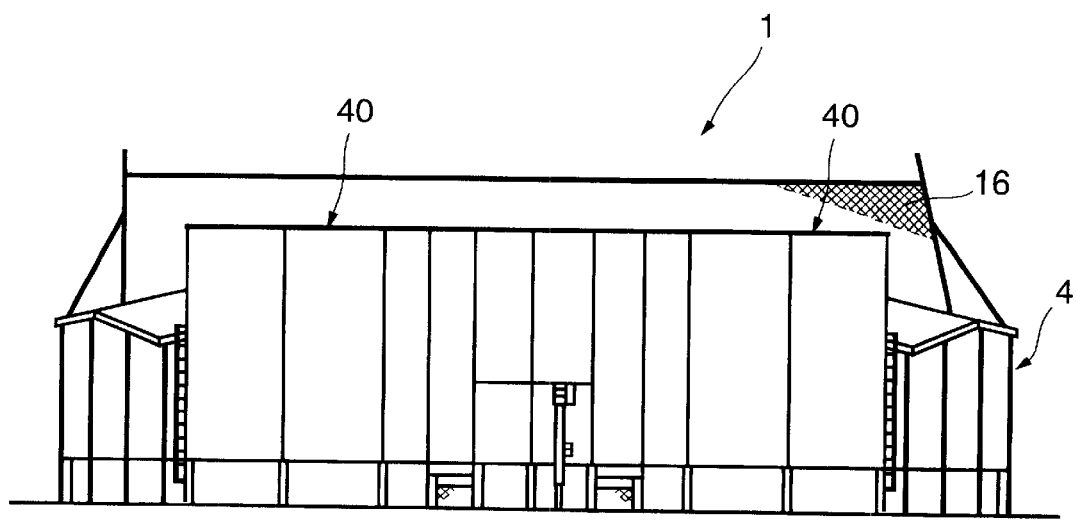
FIG. 8 is a rear elevation of the aircraft engine run-up hangar shown in FIG. 1.
Figure 9:
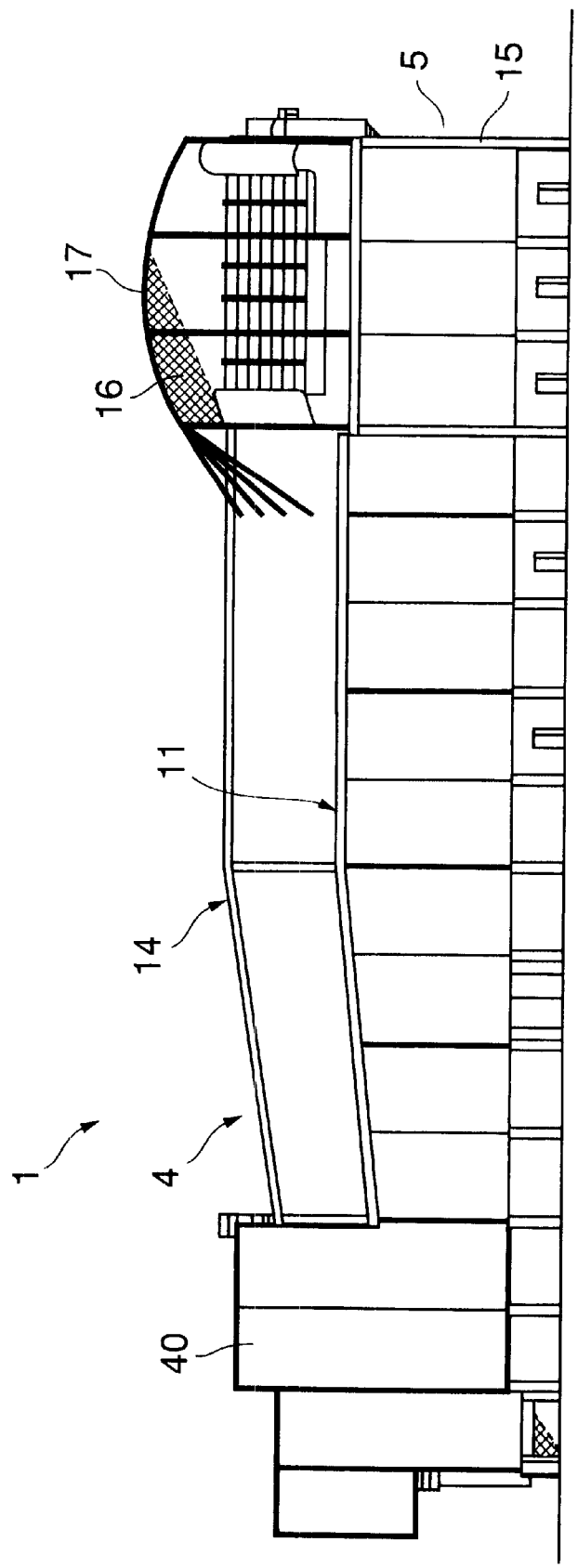
FIG. 9 is a left side elevation of the aircraft engine run-up hangar shown in FIG. 1.

Referring to FIGS. 5 and 6, the opposite side walls 36 of the test chamber 3 are provided with a sound-absorbing structure formed by attaching a sound-absorbing member to a plate. Back half sections 36a of the side walls 36 are extended obliquely toward each other such that the distance between the back half sections 36a decreases toward the back to produce proper accompanying currents in the entire test chamber 3 and to prevent the enhancement of noise by the repetitive reflection of sounds of specific frequencies by the opposite side walls 36.

Referring to FIGS. 1, 2, 5 and 6, the exhaust structure 7 is disposed in a back end part of the building 4 so as to communicated with the test chamber 3. The exhaust structure 7 has a width substantially equal to that of the back end part of the building 4. The exhaust structure has a back section that extends upward. The exhaust structure 7 has main engine exhaust ducts 37 through which exhaust gas discharged from main engines 2d supported on the right and the left main wing 2c of the aircraft 2 is exhausted, and a tail engine exhaust duct 38 through which exhaust gas discharged from the tail engine 2e of the aircraft 2 is exhausted. The tail engine exhaust duct 38 extends backward beyond the back ends of the main engine exhaust ducts 37. An exhaust opening 37a is formed at the upper end of each of the main engine exhaust ducts 37 to discharge the exhaust gas vertically upward, and an exhaust opening 38a is formed at the upper end of the tail engine exhaust duct 38 to discharge the exhaust gas vertically upward. Each main engine exhaust duct 37 has a sharply curved section 39, and a vertical section 40 extending vertically upward from the curved section 39 in a back part of the building 4. The tail engine exhaust duct 38 has a curved section 41 gently curving upward toward the back. The lower walls of the curved sections 39 and 41 are perforated. Silencing spaces 42 and 43 are formed behind the lower walls of the curved sections 39 and 41, respectively, and sound-absorbing members 44 and 45 are placed behind the lower walls of the curved sections 39 and 41, respectively.

Effects and operations of the aircraft engine run-up hangar 1 will be explained. Since the air inlet structure 6 is set on the front end part of the roof structure 14 of the building 4, the large door 15 which is opened when carrying the aircraft 2 into or out of the aircraft engine run-up hangar 1 does not need to be provided with any air inlet, and hence the large door 15 may be of simple construction similar to that of an ordinary soundproof door. Therefore, any large space is not necessary for moving and storing the large door 15, which is favorable to saving space necessary for installing the aircraft engine run-up hangar 1. The installation of the air inlet structure 6 on the roof structure 14 facilitates incorporating various current-straightening means into the air inlet structure 6. Since the air inlet structure 6 is disposed on the front end part of the roof structure 14 corresponding to the front end part of the building 4, air currents introduced through the air inlet structure 6 into the test chamber 3 tend to flow vertically downward, to impinge on the floor of the test chamber 3, to be disturbed and to induce reverse currents in the test chamber 3. However, the current deflecting member 20 disposed near the lower end of the air inlet structure 6 deflects the air currents so that the air currents flow substantially horizontally toward the aircraft 2 and do not impinge on the floor of the test chamber 3. Thus, scarcely disturbed, scarcely swirling, stable air currents flow into the engine of the aircraft 2 to ensure proper run-up conditions.

Since the exhaust structure 7 communicating with the test chamber 3 and extending backward from the back end of the test chamber 3 and then upward is disposed in the back end part of the building 4, the exhaust structure 7 does not need to be moved longitudinally when the types of aircrafts are changed, and air taken into the test chamber 3 is discharged upward from the back end part of the building 4. Therefore, space behind the building 4 for discharging air can be reduced, which is favorable to saving space for installing the aircraft engine run-up hangar 1.

The air-permeable wind guard structure 16 set on the roof structure 14 so as to surround the air inlet of the air inlet structure 6 reduces the adverse effects of wind, such as the variation of the direction and velocity of wind, and swirling or turbulent flow of air, on air currents flowing through the air inlet structure 6 into the test chamber 3, so that the distribution of the velocities of air currents in the air inlet of the air inlet structure 6 can be uniformed. Since the air inlet structure 6 is provided with the current-straightening structure 18 provided with the plurality of plates 18a arranged in a grid or a honeycomb so as to define vertical passages, air currents flowing through the air inlet structure 6 are straightened so as to flow regularly downward. Since the plurality of plates 18a arranged in a grid or a honeycomb are capable of absorbing sounds, run-up noise emitted by the engine during run-up in the building 4 can be controlled by the current-straightening structure 18 and emission of noise through the air inlet structure 6 can be reduced. Since the current-straightening structure 18 incorporated into the air inlet structure 6 opens upward, the run-up noise diffuses upward into the atmosphere and the level of the run-up noise propagating around the building 4 can be reduced. The first current-straightening member 21 straightens the air currents flowed through the current-straightening structure 18 still further.

Since the current-straightening space 19 of a predetermined height is formed under the current-straightening structure 18, and the second current-straightening member 22 is disposed in a lower end part of the current-straightening space 19, air currents flowing at different velocities below the plurality of plates 18a of the current-straightening structure 18 can be uniformed and small eddies produced in the air currents can be eliminated in the current-straightening space 19, and the air currents straightened in the current-straightening space 19 is straightened further by the second current-straightening member 22.

Since the plurality of third current-straightening members 23 are disposed in the current-straightening space 19 in a grid or in parallel to each other so as to extend in the direction of the air currents, the straightening of the air currents in the current-straightening space 19 can be promoted. Since the air inlet structure 6 is disposed at a position on the front end part of the roof structure 14 of the building 4 corresponding to a position in front of the aircraft 2 housed in the building, the air currents introduced through the air inlet structure 6 can be deflected by the current deflecting member 20 so as to flow in a substantially horizontal direction toward the aircraft 2.

Since the air inlet structure 6 has a width nearly equal to that of the building 4, the air inlet structure 6 is able to define an air passage of a large sectional area, to make air currents flow at low velocities so that the air currents can be satisfactorily straightened and to suppress the flow of air currents in lateral directions in the test chamber 3.

Since the current deflecting member 20 is a plate having a substantially J-shaped cross section, air currents on the back side of the current deflecting member 20 are deflected backward by the guiding effect of the current deflecting member 20, and air currents on the front side of the current deflecting member 20 are deflected backward by the Coanda effect. Since the current deflecting member 20 is disposed in a region around a position at a distance equal to $3/14$ to $3/7$ of the length of the air inlet structure 6 from the back end of the air inlet structure 6, air currents flow on the front and the back side of the current deflecting member 20, and the current deflecting member 20 exercises both the guiding action and the Coanda effect with reliability. The range $3/14$ to $3/7$ was determined empirically, which will be described later.

Since the fourth current-straightening member 24 is extended from a position near the lower end of the current deflecting member 20 to the ceiling of the building 4 on the back side of the current deflecting member 20, air currents flowing on the back side of the current deflecting member 20 can be straightened by the fourth current-straightening member 24.

Since the vertical tail fin passing gap 26 that permits the vertical tail fin 2b of the aircraft 2 to pass when carrying the aircraft 2 into or out of the building 4 is formed in a middle part of the current deflecting member 20, and the vertical tail fin passing gap 26 is covered with the removable cover 27, the aircraft 2 can be carried into or out of the building 4 even if the lower edge of the current deflecting member 20 is at a level below that of the tip of the vertical tail fin 2b by moving the cover 27 away from the vertical tail fin passing gap 26 to open the vertical tail fin passing gap 26 so that the vertical tail fin 2b is able to pass through the vertical tail fin passing gap 26. The current deflecting member 20 is able to function normally for deflecting air currents without being affected by the vertical tail fin passing gap 26 because the vertical tail fin passing gap 26 is closed by the cover 27 during run-up.

Since the wind guard structure 16 has an open-area ratio in the range of 50% to 75%, the wind guard structure 16 provides a low resistance against the passage of air currents and exercises a protective function against wind satisfactorily. Since the wind guard structure 16 has a mean height of 2.0 m or above, the wind guard structure 16 is able to exercise the protective function satisfactorily. Since the air-permeable, upper wind guard 17 is disposed on the upper end of the wind guard structure 16 at a level substantially equal to that of the upper end of the wind guard structure 16 so as to cover the upper end of the air inlet structure 6. The upper wind guard 17 reduces the effect of wind and wind direction on air currents flowing therethrough into the air inlet structure 6 and uniforms the velocity of the air currents in the entire region of the air inlet structure 6.

The current-straightening structure 18 having a predetermined height along the direction of the air current has a satisfactory current-straightening ability. Since the plates of the current-straightening structure 18 are formed of a sound-absorbing material, run-up noise emitted by the engine during run-up in the building 4 can be effectively absorbed by the sound-absorbing plates of the current-straightening structure 18 and emission of noise through the air inlet structure 6 of the building 4 can be reduced. Since the current-straightening members 21, 22, 23 and 24 are metal nets, textile nets, perforated plates, slit plates or expanded metals, and have an open-area ration in the range of 40% to 70%, The current-straightening plates 21, 22, 23 and 24 are simple in construction, do not provide excessively large resistance against the flow of air currents, and have a satisfactory current-straightening ability.

Since the inclined section 30 for straightening air currents flowing through the test chamber 3 is formed in a part of the ceiling of the building 4, and the groove 31 is formed in a middle part, with respect to the width, of the inclined section 30 to allow the vertical tail fin 2b of the aircraft 2 to pass when the aircraft 2 is carried into or out of the test chamber 3, the inclined section 30 can be formed at a level far lower than that of the vertical tail fin 2b of the aircraft 2 so as to slope down toward the back, accompanying currents accompanying the flow of the exhaust gas emitted from the engine of the aircraft 2, and air around the accompanying currents can be made to flow regularly toward the back of the test chamber 3, the accompanying currents can be produced so as to prevent the generation of reverse currents, air currents on the upstream side of the engines 2d and 2e of the aircraft 2 can be straightened, and proper run-up conditions can be ensured for the run-up of the engines 2d and 2e of the aircraft 2.

The inclined section 30 of the ceiling has the laterally opposite parts respectively extending on the opposite sides of the groove 3 and sloping down toward the right side wall structure 12 and the left side wall structure 11 in parallel to the roof of the roof structure 14. The flow of the accompanying currents decreases with distance from the groove 31. Therefore, the laterally opposite parts of the inclined section 30 are sloped down toward the right side wall structure 12 and the left side wall structure 11, respectively, to prevent the reduction of the velocity of the accompanying currents in the vicinity of the right side wall structure 12 and the left side wall structure 11. Since the reverse flow stopping plate 32 of a width approximately equal to that of the test chamber 3 is disposed so as to extend in front of the vertical tail fin 2b of the aircraft 2 placed in the test chamber 3, the reverse flow of the exhaust gas through an upper space in the back part of the test chamber 3 toward the front of the test chamber can be prevented by the reverse flow stopping plate 32.

The vertical tail fin passing gap 33, which allows the passage of the vertical tail fin 2b when carrying the aircraft 2 into or out of the aircraft engine run-up hangar 1, is formed in a middle part, with respect to width, of the reverse flow stopping plate 32, and the vertical tail fin passing gap 33 can be closed or opened by laterally moving the pair of covers 34 by the driving device. The vertical tail fin passing gap 33 is opened when the aircraft is carried into or out of the aircraft engine run-up hangar 1, and is kept closed during run-up. Thus the reverse flow of the exhaust gas through the vertical fin passing gap 33 can be prevented. Since the reverse flow stopping plate 32 is disposed near the back end of the inclined section 30 of the ceiling, the air currents flowing along the inclined section 30 flow backward beyond the reverse flow stopping plate 32 and is prevented from flowing upstream by the reverse flow stopping plate 32.

The pair of current-straightening plates 35 are extended down from the opposite side walls of the groove 31 to straighten air currents flowing toward the tail engine 2e. Air currents flowing along the inclined section 30 of the ceiling flow laterally toward the groove 31 and are sucked into the tail engine 2e to affect the operation of the tail engine 2e adversely. The pair of current-straightening plates 35 straightens the air currents laterally flowing toward the tail engine 2e. The current-straightening plates 35 are metal nets, textile nets, perforated plates, slit plates or expanded metals.

Since the back half sections 36a of the opposite side walls 36 of the test chamber 3 are extended obliquely toward each other such that the distance between the back half sections 36a decreases toward the back, proper accompanying currents can be produced in the entire test chamber 3 and the enhancement of sound pressure generated in the air current by the repetitive reflection of sounds of specific frequencies by the opposite side walls 36 can be suppressed. The sound-absorbing structures incorporated into the opposite side walls 36 of the test chamber 3 absorb and reduce noise.

Since the exhaust structure 7 having a width substantially equal to that of the back end part of the building 4 defines an exhaust passage of a large sectional area, the exhaust gas and the accompanying currents can be smoothly discharged and stable, backward air currents can be produced in the test chamber 3.

It is desirable that the engines 2d and 2e are spaced predetermined distances apart, respectively, from the exhaust structure 7. The exhaust structure 7 has the wide main engine exhaust ducts 37 through which exhaust gas discharged from the main engines 2d supported on the right and the left main wing 2c of the aircraft 2 is exhausted, and the narrow tail engine exhaust duct 38 through which exhaust gas discharged from the tail engine 2e of the aircraft 2 is exhausted. The main engine exhaust ducts 37 and the tail engine exhaust duct 38 can be spaced proper distances apart from the main engines 2d and the tail engines 2e, respectively, by disposing the tail engine exhaust duct 38 on the back side of the main engine exhaust ducts 37.

Since each main engine exhaust duct 37 has the curved section 39 capable of sound absorption, the flow of the exhaust gas can be smoothly guided, noise can be absorbed and the exhaust gas can be discharged vertically upward. The main engine exhaust duct 37 has the vertical section 40 extending vertically upward from the curved section 39 in the back end part of the building 4. The vertical section 40 can be disposed along the back end wall structure 13 and hence can be formed in simple construction. The tail engine exhaust duct 38 has the sound-absorbing curved section 41 gently curving upward toward the back. Thus, the flow of the exhaust gas discharged from the tail engine 2e can be smoothly guided, noise can be absorbed and the exhaust gas can be discharged vertically upward.

Results of model experiments conducted to demonstrate the abilities of the current-straightening members included in the aircraft engine run-up hangar 1 will be explained with reference to FIGS. 10 to 19.

Figures 10, 11, 12:
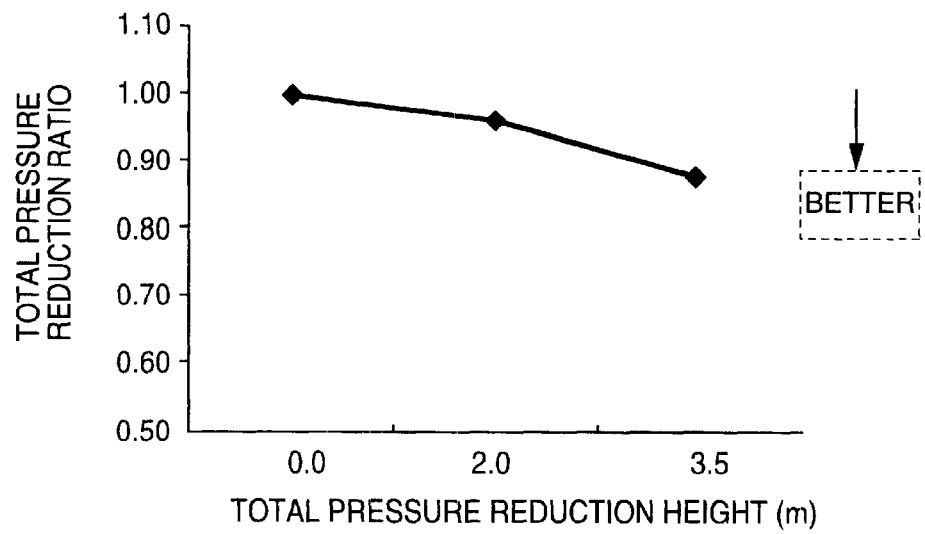
FIG. 10 is table showing data obtained through model experiments conducted to examine the effect of the height of a wind guard structure.
FIG. 11 is a graph showing the data tabulated in the table shown in FIG. 10.
FIG. 12 is a table showing data obtained through model experiments on the open-area ratio of the wind guard structure.

FIGS. 10 and 11 show data obtained through model experiments conducted to examine the effect of the height of the wind guard structure 16. The term "height of the wind guard structure" signifies the height of the top of the wind guard structure 16 from the ridge of the roof structure 14. In FIGS. 10 and 11, "total pressure reduction" is the difference between the atmospheric pressure and a measured total pressure at a position immediately in front of the air inlet of the main engine, and "total pressure reduction ratio" is the ratio of a total pressure reduction to that when the height of the wind guard structure 16 is 0 m. The wind guard structure 16 was formed by putting together two metal nets having an open-area ratio $\phi=70\%$. As obvious from FIGS. 10 and 11, the greater the height of the wind guard structure 16, the smaller is the total pressure drop ratio and the smaller the swirling and turbulent flows in the air currents. Thus, it is desirable that the height (mean height) of the wind guard structure 16 is 2 m or above.

Figures 13, 14:
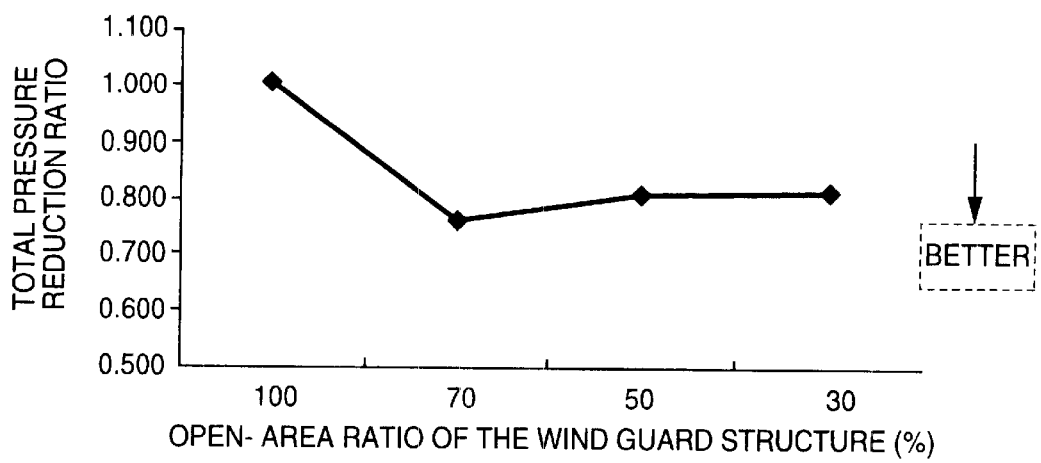
FIG. 13 is a graph showing the data tabulated in the table shown in FIG. 12.
FIG. 14 is a table showing data obtained through model experiments on the intensity of turbulent flow above an engine.

FIGS. 12 and 13 show data obtained through experiments conducted to examine the effect of the open-area ratio $\phi$ of the walls of the wind guard structure 16. A sample wind guard structure having walls each formed of a single metal net having an open-area ratio of 70%, a first sample wind guard structure having walls each formed of a single metal net having an open-area ratio of 70%, a second sample wind guard structure having walls each formed by putting together two metal nets having an open-area ratio of 70%, and a third sample wind guard structure having walls each formed by putting together three metal nets having an open-area ratio of 70% were subjected to the experiments. It is known from the results of the experiments that the protective ability of the wind guard structure 16 is low when the open-area ratio of the wind guard structure 16 is either excessively large or excessively small, and that a desirable range for the open-area ratio of the wind guard structure 16 is 50% to 75%.

FIGS. 14 and 15 show data obtained through experiments conducted to examine the effect of the open-area ratio $\phi$ of the second current-straightening member 22. Five different sample second current-straightening members were subjected to the experiments. It is known from the results of the experiments that the current-straightening ability of the second current-straightening member 22 is low when the open-area ratio $\phi$ of the second current-straightening member 22 is either excessively large or excessively small, and that a desirable range for the open-area ratio of the second current-straightening member 22 is 40% to 70%. The open-area ratio of a current-straightening member formed by putting together two metal net having an open-area ratio $\phi=70\%$ is about 50%.

FIGS. 16 and 17 show data obtained through experiments conducted to examine the effect of the position of the current deflecting member 20 on the total pressure reduction ratio. In FIGS. 16 and 17, the position (b) of the current deflecting member 20 is represented by the distance between the current deflecting member 20 and the back end of the air inlet structure 6 to the length B of the air inlet structure 6. For example, a position $b=\frac{1}{7}$ is at a distance equal to B/7 from the back end of the air inlet structure 6. In FIGS. 16 and 17, "pressure reduction" is the difference between the atmospheric pressure and a measured total pressure at a position immediately in front of the air inlet of the engine in the rest chamber 3, and "total pressure reduction ratio" is the ratio of a total pressure reduction to that when the current deflecting member 20 is located at the position b=0, i.e., at the back end of the air inlet structure 6. It is known from FIGS. 16 and 17 that it is most desirable that the current deflecting member 20 is disposed at a position at a distance in the range of 3B/14 to 3B/7 from the back end of the air inlet structure 6.

Figure 18:
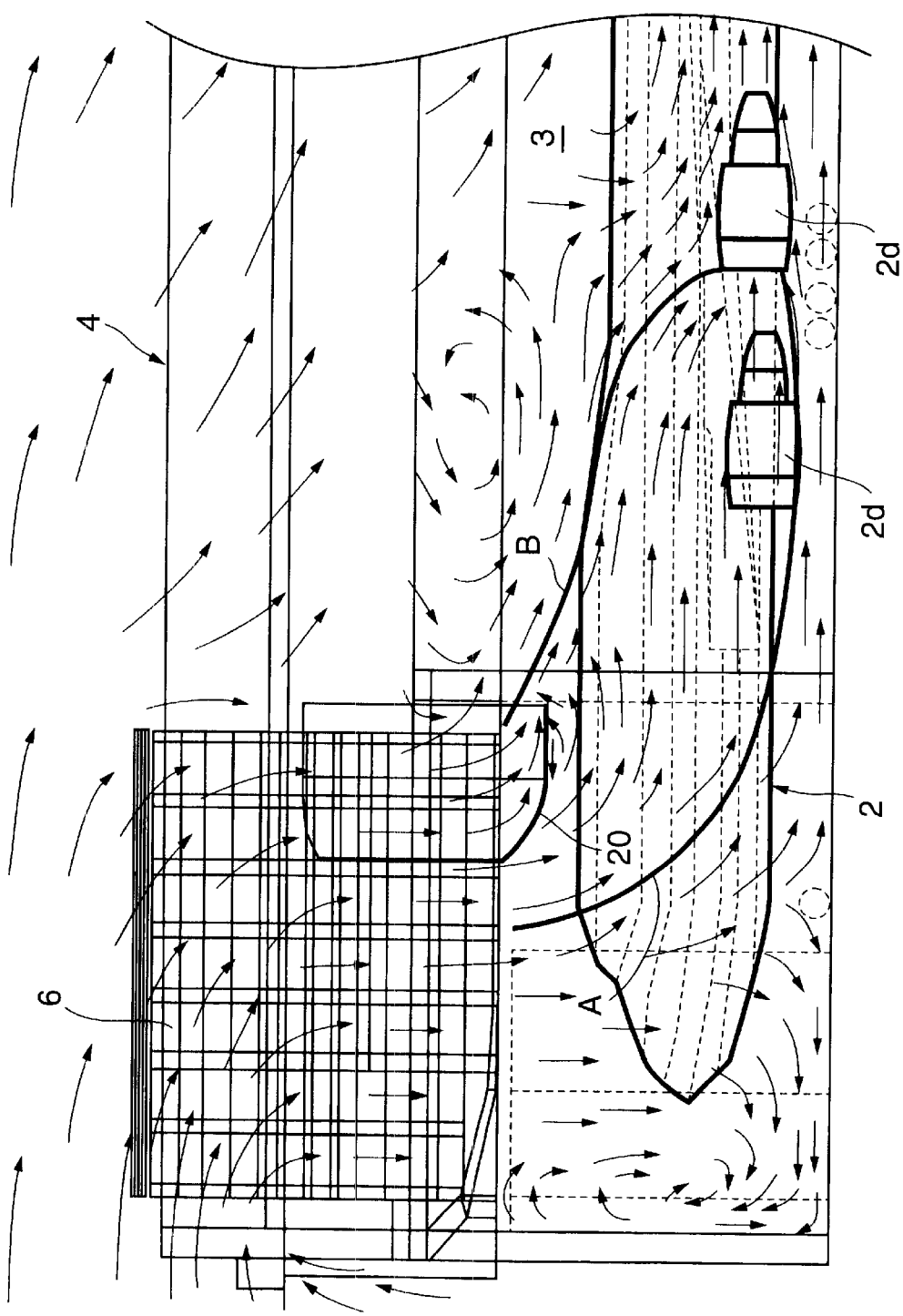
FIG. 18 is a velocity vector diagram of assistance in explaining air currents in the aircraft engine run-up hangar shown in FIG. 1.
Figure 19:
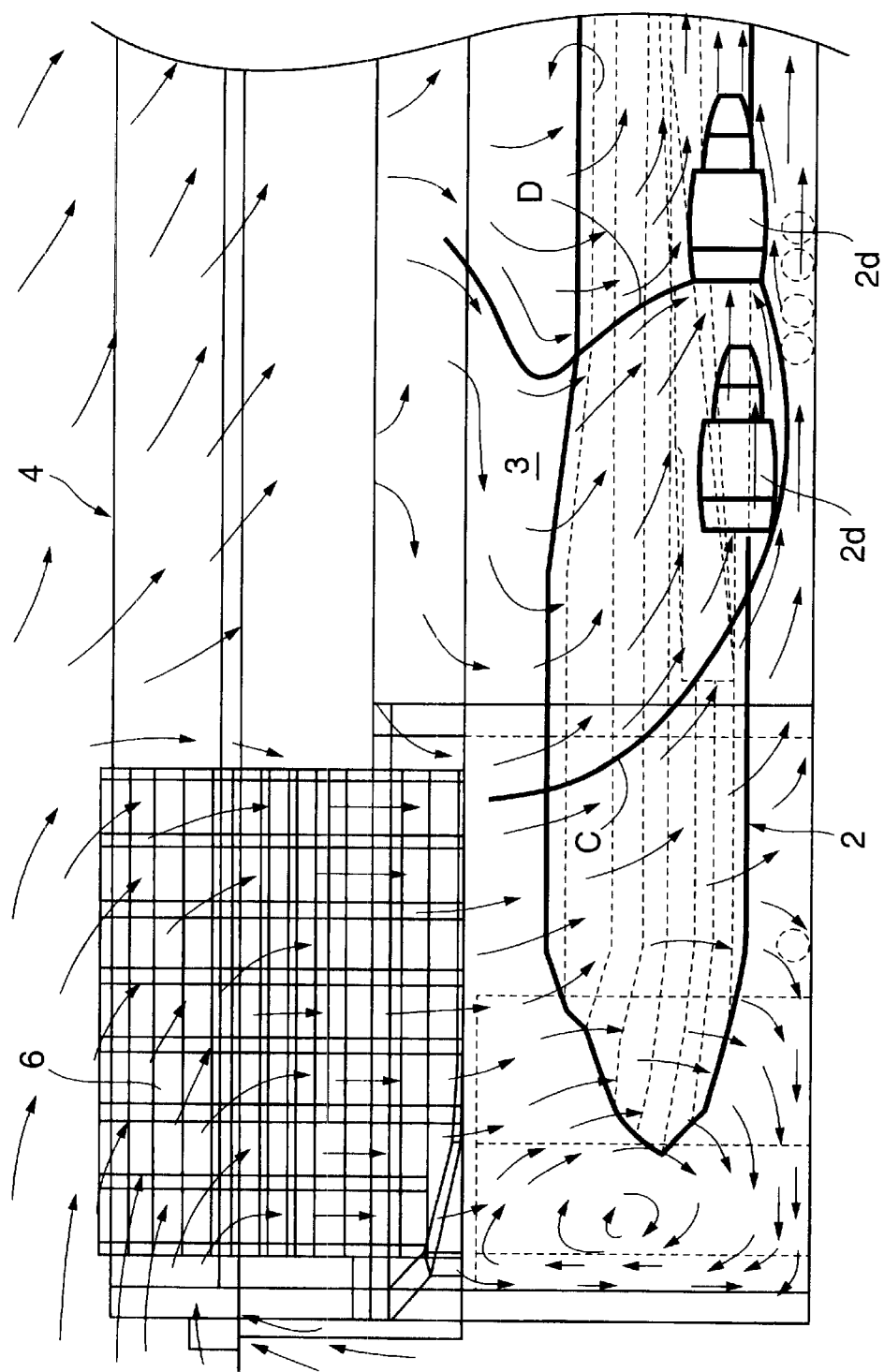
FIG. 19 is a velocity vector diagram of assistance in explaining air currents in an aircraft engine run-up hangar in a comparative example.
Figure 20:
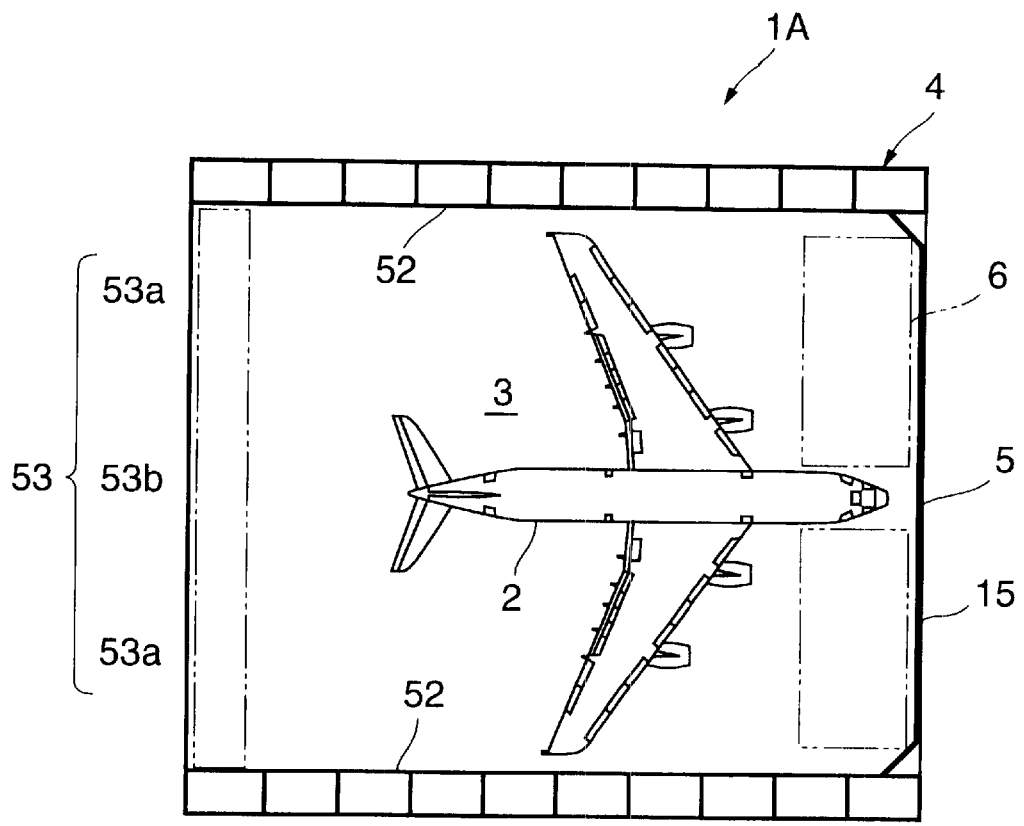
FIG. 20 is a sectional plan view of an aircraft engine run-up hangar in a first modification of the aircraft engine run-up hangar shown in FIG. 1.
Figure 21:
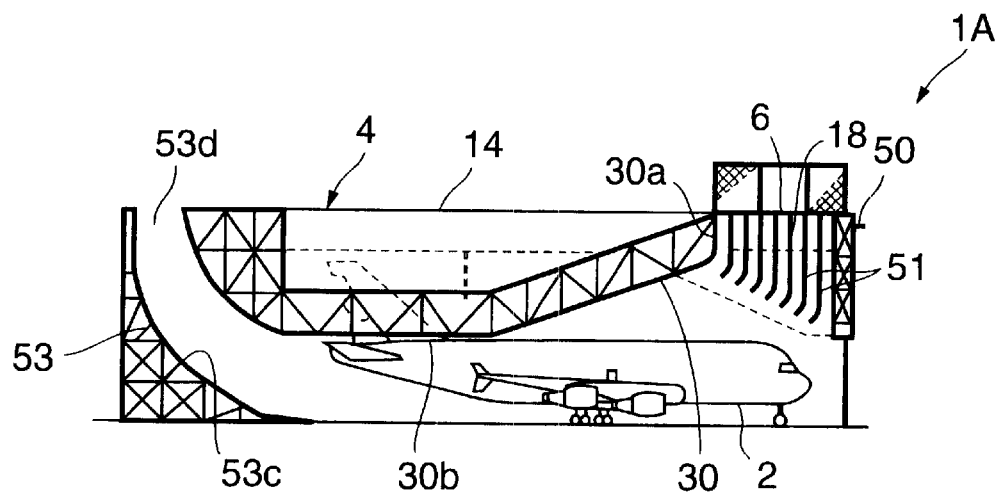
FIG. 21 is a longitudinal sectional view of the aircraft engine run-up hangar shown in FIG. 20.
Figure 22:
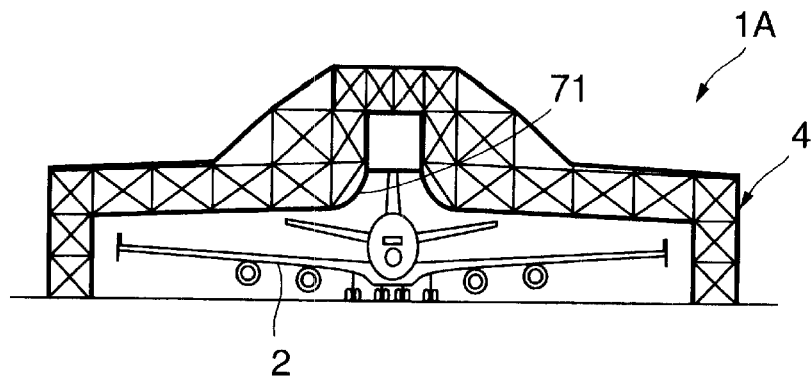
FIG. 22 is a cross-sectional view of the aircraft engine run-up hangar shown in FIG. 20.
Figure 23:
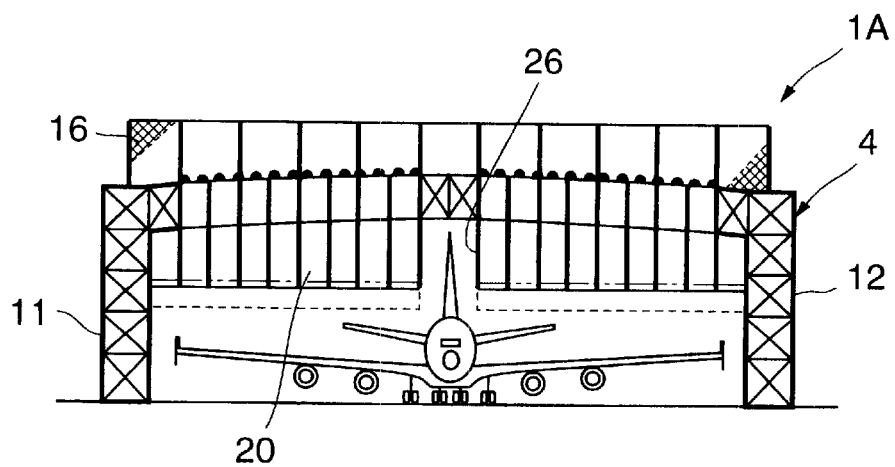
FIG. 23 is a cross-sectional view of the aircraft engine run-up hangar shown in FIG. 20.
Figure 24:
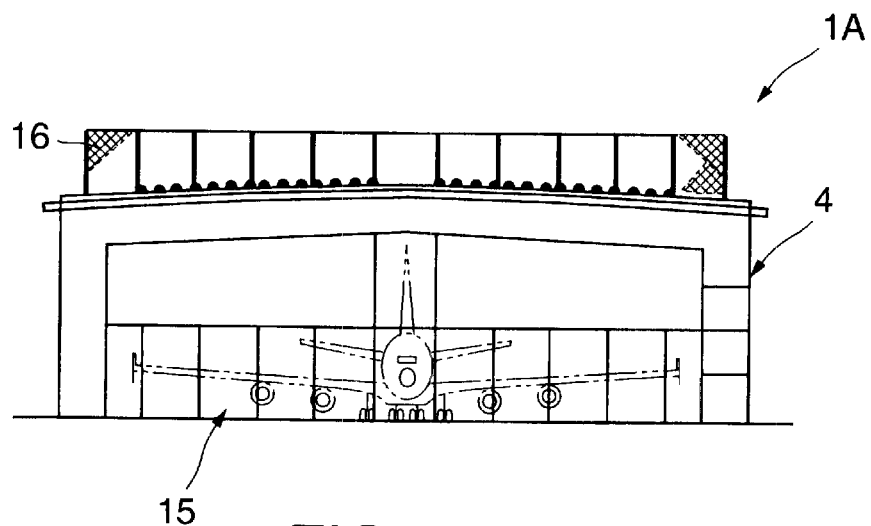
FIG. 24 is a front elevation of the aircraft engine run-up hangar shown in FIG. 20.

FIGS. 18 and 19 are simplified conceptional streamline diagrams indicating velocity vectors of air currents obtained by analyzing air currents in the aircraft engine run-up hangar 1 by a finite element method using a numerical fluid analyzing program. FIG. 18 is a streamline diagram in the aircraft engine run-up hangar 1 provided with the current deflecting member 20, and FIG. 19 is a streamline diagram in an aircraft engine run-up hangar in a comparative example not provided with any member corresponding to the current deflecting member 20. Curves A and B in FIG. 18 and curves C and D in FIG. 19 are manually drawn curves indicating boundaries between air currents flowing into the main engine 2d and those not flowing into the main engine 2d. It is known from FIGS. 18 and 19 showing velocity vectors of air currents that air currents flowing upstream from a region behind the main engine 2d flow into the main engine 2d in the aircraft engine run-up hangar in the comparative example not provided with any member corresponding to the current deflecting member 20, and air currents flow upstream scarcely from a region behind the main engine 2d into the main engine 2d.

Aircraft engine run-up hangars in modifications of the foregoing aircraft engine run-up hangar 1 embodying the present invention will be described with reference to FIGS. 20 to 34, in which parts like or corresponding to those of the aircraft engine run-up hangar in the first embodiment are denoted by the same reference characters and the description thereof will be omitted.

Figure 34:
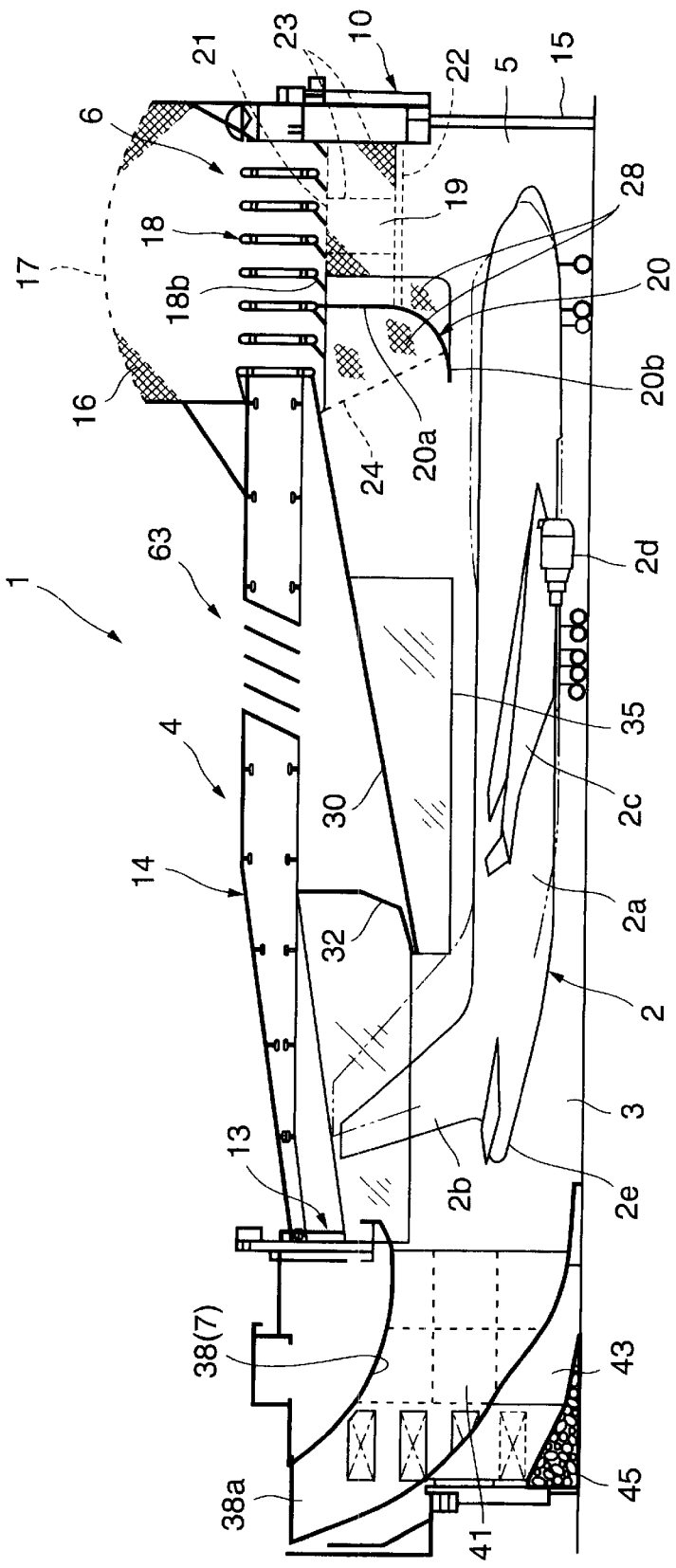
FIG. 34 is a longitudinal sectional view of an aircraft engine run-up hangar in a tenth modification of the aircraft engine run-up hangar shown in FIG. 1.

(1) The cover 27 for closing the vertical tail fin passing gap 26 shown in FIG. 1 may be omitted. When the cover 27 is omitted, a pair of vertical current-straightening plates 28 are extended longitudinally on the opposite sides of the vertical tail fin passing gap 26 so as to cover the side edges of the current deflecting member 20 as shown in FIG. 34. The current-straightening plates 28 may be steel plates, perforated plates provided with many small holes, or slit plates provided with many small slits. The pair of current-straightening plates 28 suppress the generation of swirling or turbulent flows at the edges of the current deflecting member 20 defining the vertical tail fin passing gap 26.

(2) In an aircraft engine run-up hangar 1A shown in FIGS. 20 to 24, a roof structure 14 included in a building 4 and supporting an air inlet structure 6 slopes down scarcely toward the eaves. An eaves current-straightening structure 50 resembling eaves is formed in parts of the eaves of the roof structure 14 of the building 4 corresponding to the periphery of the air inlet structure 6 to reduce the adverse effect of wind that flows upward along the front end wall and the opposite side walls of the building 4. A plurality of current deflecting members 51, for example, six current deflecting members 51 having a J-shaped cross section are formed integrally with a plurality of laterally extended plates included in a current-straightening structure 18 so as to extend downward from the lower ends of the laterally plates. The current deflecting members 51 nearer to the front end wall of the building 4 are longer than those farther from the front end wall of the building 4.

The ceiling of the building 4 has an inclined section 30 provided with a groove, and a vertical part 30a is formed at the front end of an inclined section 30 such that the vertical part 30a serves as a current deflecting member at the back end of the air inlet structure 6. The ceiling has a horizontal section 30b extending backward from the back end of the inclined section 30 to an exhaust duct. Thus there is no possibility that the exhaust gas flows upstream. Although the aircraft engine run-up hangar 1A is provided with a movable reverse flow stopping member for c closing the groove in the inclined section 30 of the ceiling, the aircraft engine run-up hangar 1A is not provided with any member corresponding to the reverse flow stopping plate 32.

The building 4 has parallel right and left side walls 52. An exhaust structure 53 has two main engine exhaust ducts 53a and a tail engine exhaust duct 53b having the same shape in side elevation. The exhaust structure 53 has a width equal to that of a back end part of the building 4. The exhaust structure has a gently curved passage 53c curving gradually upward toward the back and having an exhaust opening 53d opening vertically upward. Curved connecting members 71 connect parts of the inclined section 30 of the ceiling extending on the opposite sides of the groove formed in the inclined section 30 and the opposite side walls of the groove formed in the inclined section 30, respectively. Air currents flowing along the inclined section 30 and flowing laterally through the groove formed in the inclined section 30 into the tail engine are straightened by the curved connecting members 71.

The plurality of current deflecting members 51 have an excellent current deflecting ability. Since the roof structure 14 is sloped down scarcely toward the eaves, the air inlet opening of the air inlet structure 6 is substantially horizontal and hence the velocities of air currents can be easily distributed uniformly over the entire air inlet opening of the air inlet structure 6. The exhaust structure 53, and the right side wall structure 12 and the left side wall structure 11 of the building 4 are simple in construction.

Figure 25:
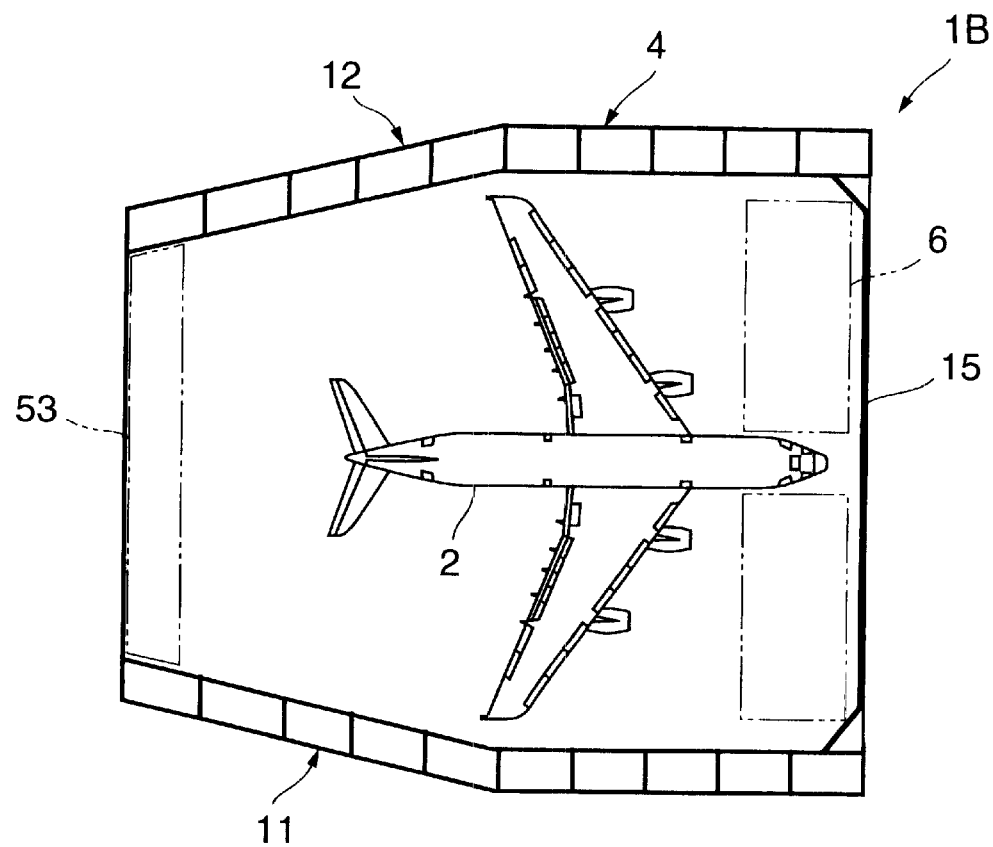
FIG. 25 is a sectional view of an aircraft engine run-up hangar in a second modification of the aircraft engine run-up hangar shown in FIG. 25 in a horizontal plane.
Figure 26:
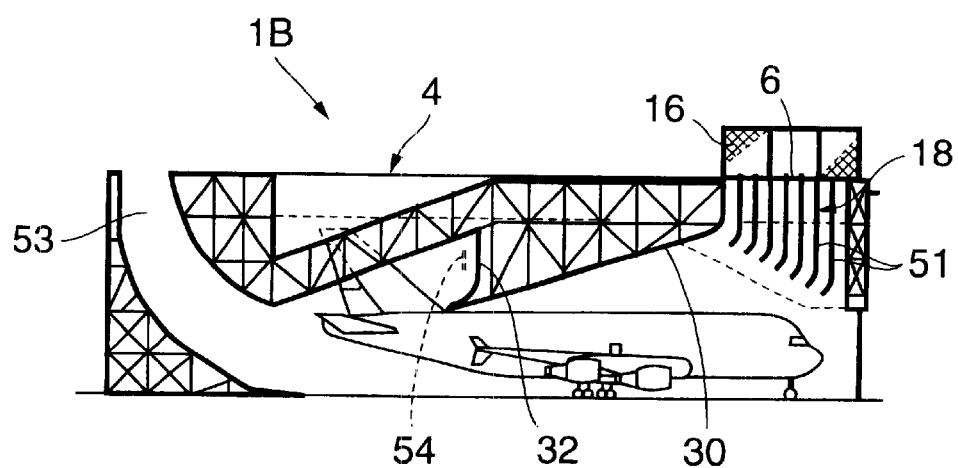
FIG. 26 is a longitudinal sectional view of the aircraft engine run-up hangar shown in FIG. 25.

(3) An aircraft engine run-up hangar 1B shown in FIGS. 25 and 26 is provided with a plurality of current deflecting members 51 similar to those of the aircraft engine run-up hangar 1A, and a reverse flow stopping plate 32 disposed at a position corresponding to the back end of an inclined section 30 of a ceiling included in a building 4. A groove formed in the inclined section 30 is closed by a reverse flow stopping cover 54. The opposite side wall structures of the building 4 are the same as those of the aircraft engine run-up hangar 1. An exhaust structure 53 included in the aircraft engine run-up hangar 1B is substantially similar to that of the aircraft engine run-up hangar 1A.

Figure 27:
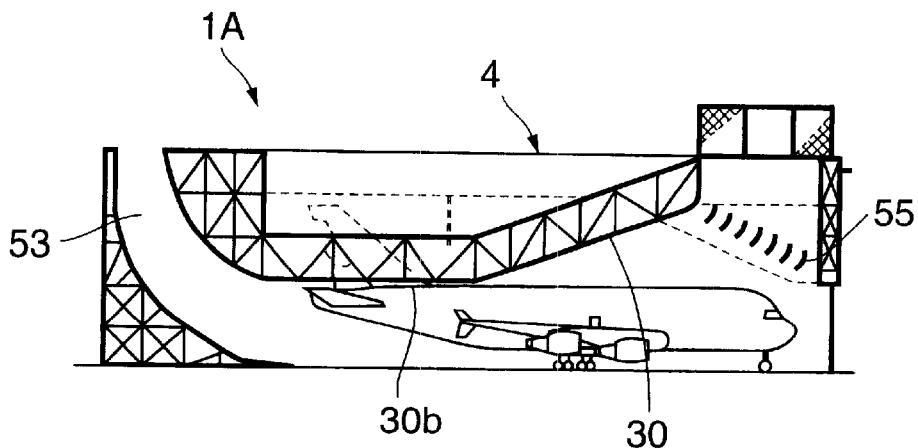
FIG. 27 is a longitudinal sectional view of an aircraft engine run-up hangar in a third modification of the aircraft engine run-up hangar shown in FIG. 1.

(4) The plurality of current deflecting members may be replaced with a plurality of curved guide members 55 longitudinally arranged at predetermined intervals such that the curved guide members 55 nearer to the front end of the building 4 are at lower levels as shown in FIG. 27. The curved guide members 55 may be replaced with inclined flat guides members or vertical flat guide members.

Figure 28:
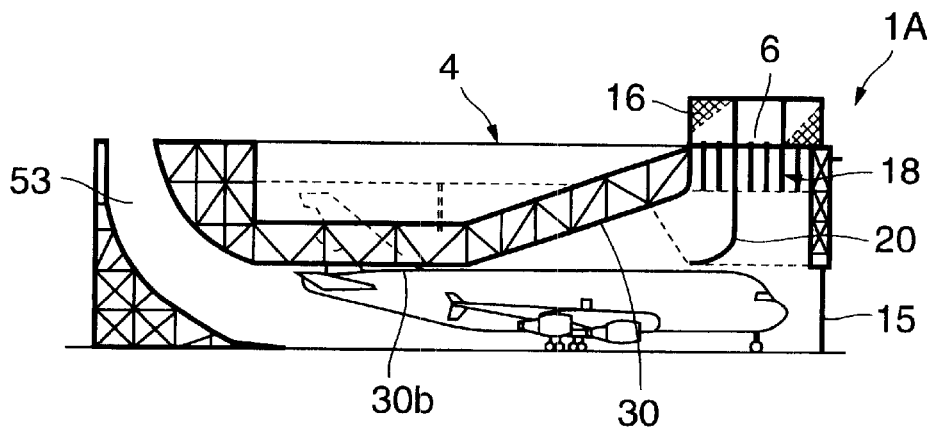
FIG. 28 is a longitudinal sectional view of an aircraft engine run-up hangar in a fourth modification of the aircraft engine run-up hangar shown in FIG. 1.

(5) Referring to FIG. 28, a building 4 including a ceiling similar to that of the aircraft engine run-up hangar 1A shown in FIGS. 20 to 24 and having an inclined section 30 and a horizontal section 30b, and an exhaust structure 53 similar to that of the aircraft engine run-up hangar 1A shown in FIGS. 20 to 24 is provided with a current deflecting member 20 similar to that of the aircraft engine run-up hangar 1A shown in FIGS. 20 to 24.

Figure 29:
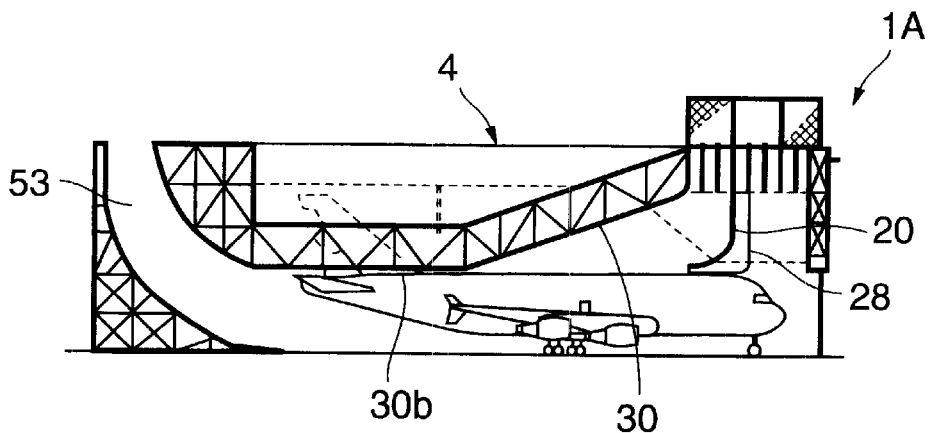
FIG. 29 is a longitudinal sectional view of an aircraft engine run-up hangar in a fifth modification of the aircraft engine run-up hangar shown in FIG. 1.

(6) Referring to FIG. 29, a building 4 including a ceiling similar to that of the aircraft engine run-up hangar 1A shown in FIGS. 20 to 24 and having an inclined section 30 and a horizontal section 30b, and an exhaust structure 53 similar to that of the aircraft engine run-up hangar 1A shown in FIGS. 20 to 24 is provided with a current deflecting member 20 similar to that of the aircraft engine run-up hangar 1A shown in FIGS. 20 to 24, and a pair of current straightening plates 28 similar to those of the aircraft engine run-up hangar 1A mentioned in (1) and extended longitudinally on the opposite sides of a vertical tail fin passing gap 26 so as to cover the side edges of the current deflecting member 20.

Figure 30:
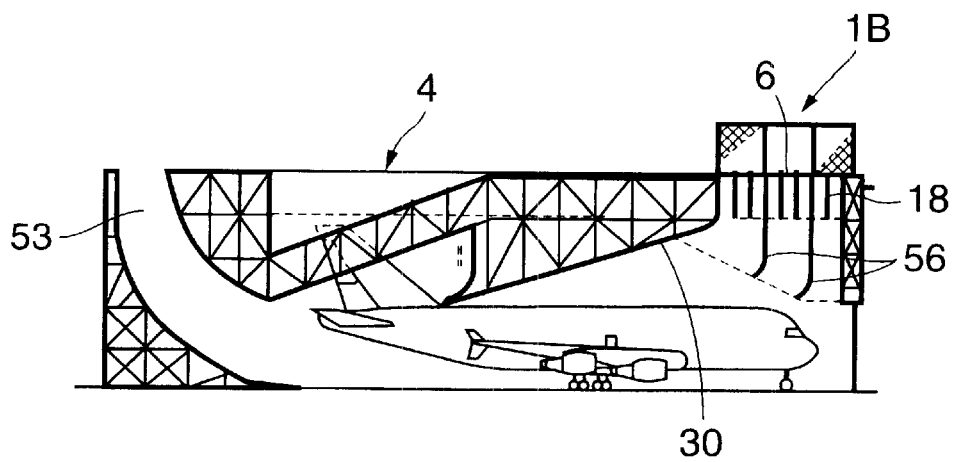
FIG. 30 is a longitudinal sectional view of an aircraft engine run-up hangar in a sixth modification of the aircraft engine run-up hangar shown in FIG. 1.

(7) Referring to FIG. 30, an aircraft engine run-up hangar 1B has a ceiling similar to that of the aircraft engine run-up hangar 1B shown in FIGS. 25 and 26, and two current deflecting members 56 longitudinally arranged at an interval and each having a J-shaped cross section.

Figure 31:
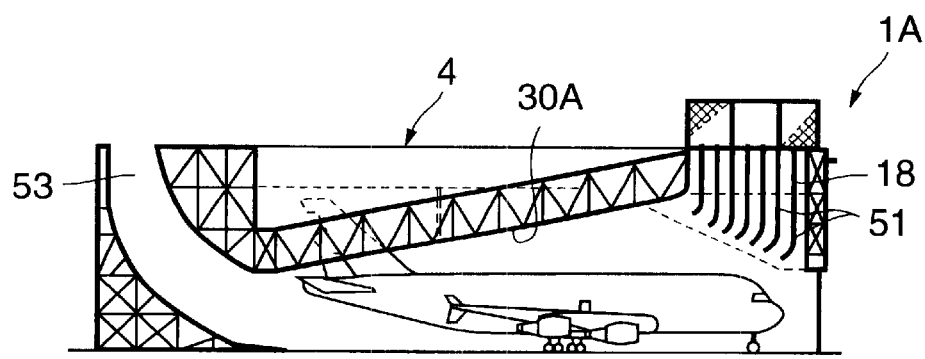
FIG. 31 is a longitudinal sectional view of an aircraft engine run-up hangar in a seventh modification of the aircraft engine run-up hangar shown in FIG. 1.

(8) Referring to FIG. 31, an aircraft engine run-up hangar 1A similar to that shown in FIGS. 20 to 24 has an inclined ceiling 30A having an inclined section 30 sloping down backward and extending to an exhaust structure 53.

Figure 32:
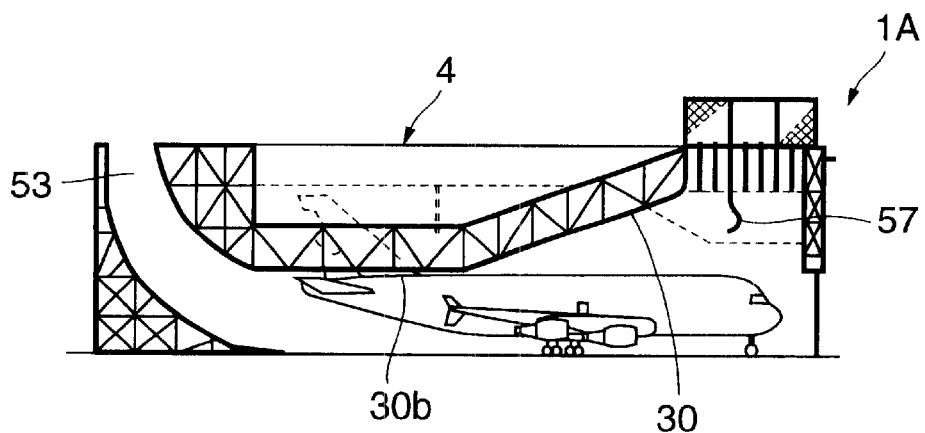
FIG. 32 is a longitudinal sectional view of an aircraft engine run-up hangar in an eighth modification of the aircraft engine run-up hangar shown in FIG. 1.

(9) Referring to FIG. 32, an aircraft engine run-up hangar 1A similar to that shown in FIGS. 20 to 24 is provided with a single current deflecting member 57 having a substantially S-shaped cross section instead of the current deflecting members 51 of the aircraft engine run-up hangar 1A shown in FIGS. 20 to 24.

Figure 33:
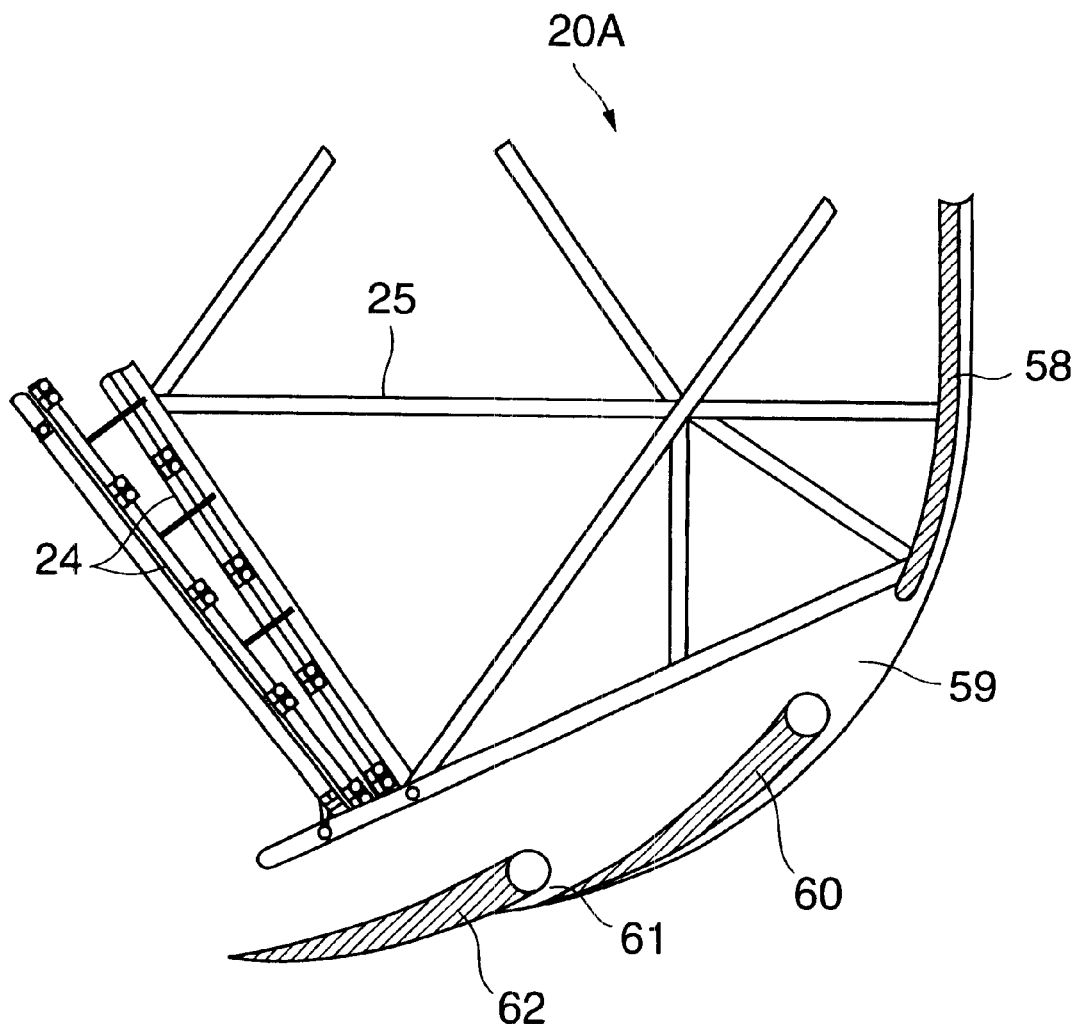
FIG. 33 is a longitudinal sectional view of an aircraft engine run-up hangar in a ninth modification of the aircraft engine run-up hangar shown in FIG. 1.

(10) Referring to FIG. 33, a current deflecting structure 20A employed instead of the current deflecting member 20 includes a substantially vertical deflecting member 58, a curved flap 60 disposed below the deflecting member 58 such that a gap 59 is formed between the lower edge of the deflecting member 58 and the upper edge of the flap 60, and a curved flap 62 disposed below the curved flap 60 such that a gap 61 is formed between the lower edge of the curved flap 60 and the upper edge of the curved flap 62. The curved flaps 60 and 62 suppress the separation of air currents from the current deflecting structure 20A, the generation of whirling air currents and turbulent air currents to ensure an air current condition suitable for run-up.

(11) Referring to FIG. 34, an aircraft engine run-up hangar 1 similar to the aircraft engine run-up hangar 1 shown in the preferred embodiment, may be provided with an air inlet structure 63 in a roof structure 14 included in a building 4 to introduce fresh air into a front section of a groove 31. Air currents flowing through the air inlet structure 63 into the groove 31 suppress the reverse flow of the exhaust gas into the groove 31.

As apparent from the foregoing description, the present invention has the following effects.

Since the air inlet structure is disposed on the front end part of the roof structure corresponding to a front end part of the building, the large door for closing a large opening through which the aircraft is carried into or out of the building does not need to be provided with any air inlet structure, and the large door may be of simple construction similar to that of an ordinary soundproof door. Therefore any space for moving and storing the large door is not necessary, which is favorable to saving space necessary for installing the aircraft engine run-up hangar and is convenient in incorporating various current-straightening means into the air inlet structure.

Since the one or the plurality of current deflecting members are disposed near the lower end of the air inlet structure, the air currents are deflected so as to flow substantially horizontally toward the aircraft and not to impinge on the floor of the test chamber. Thus, scarcely disturbed, scarcely swirling stable air currents flow into the engine of the aircraft to ensure proper run-up conditions.

Since the exhaust structure is connected to the rear end part of the building so as to form the exhaust passage extending obliquely upward from the back end of the building, any work for moving an exhaust duct is not necessary when aircrafts are changed. Since air in the test chamber is discharged upward through the back end part of the building, the exhaust structure has a comparatively short length and needs a comparatively small space for installation behind the building, which is favorable to saving space necessary for installing the aircraft engine run-up hangar.

The wind guard structure reduces the effect of wind and wind direction on the air currents flowing through the air inlet structure into the test chamber and makes uniform the distribution of velocities of the air currents in the entire region of the air passage in the air inlet structure.

The current-straightening structure straightens the air currents so as to flow regularly downward. When the plurality of plates arranged in a grid or a honeycomb of the current-straightening structure are formed of a sound-absorbing material, run-up noise emitted by the engine during run-up in the building can be controlled by the current-straightening structure. Since the current-straightening structure incorporated into the air inlet structure opens upward, the run-up noise diffuses upward into the atmosphere and the level of the run-up noise propagating around the building can be reduced.

The first current-straightening member straightens the air currents still further.

Since the current-straightening space of a predetermined height is formed under the current-straightening structure, and the second current-straightening member is disposed in a lower end part of the current-straightening space, air currents flowing at different velocities below the plurality of plates of the current-straightening structure can be uniformed and small eddies produced in the air currents can be eliminated in the current-straightening space.

The plurality of third current-straightening members are disposed vertically in the current-straightening space so as to extended in the direction of the air currents promote the straightening of the air currents in the current-straightening space.

Since the air inlet structure is disposed at a position on the front end part of the roof structure of the building corresponding to a position in front of the aircraft housed in the building, the air currents flowing through the air inlet structure into the building can be deflected by the current deflecting member so as to flow in a substantially horizontal direction toward the aircraft.

Since the air inlet of the air inlet structure has a width nearly equal to the width of the front end part of the building, the air inlet structure has a large sectional area and hence air currents flow through the air inlet structure at low velocities. Consequently, air currents can be effectively straightened and the flow of the air currents in lateral directions in the building can be effectively suppressed.

Since the one or the plurality of current deflecting members are plates having a substantially J-shaped cross section, air currents on the back side of the current deflecting member or members are deflected backward by the guiding effect of the current deflecting member or members, and air currents on the front side of the current deflecting member or members are deflected backward by the Coanda effect Since the one or the plurality of current deflecting members are plates having a substantially J-shaped cross section, and the current deflecting member or members are disposed in a region around a position at a distance equal to $3/14$ to $3/7$ of the length of the air inlet structure from the back end of the air inlet structure, air currents flow on the front and the back side of the current deflecting member or members, and the current deflecting member or members exercise both the guiding action and the Coanda effect with reliability.

The fourth current-straightening member extended from a position near the lower end of the current deflecting member to the ceiling of the building on the back side of the current deflecting members straightens air currents flowing on the back side of the current deflecting member.

The current deflecting member having the substantially J-shaped cross section and provided with one or a plurality of flaps suppresses the generation of eddies attributable to burble.

Since the plurality of current deflecting members are formed integrally with lower edge parts of the plurality of plates extended laterally in the current-straightening structure, respectively, the air currents straightened by the current-straightening structure can be effectively deflected.

Since the plurality of current deflecting members comprise a plurality of guide members arranged at predetermined longitudinal intervals, the air currents straightened by the current-straightening structure can be effectively deflected.

Since the plurality of guide members extend downward such that lower edges thereof are at the same level as the front guide members, the deflected air currents will not be easily disturbed and the air currents are stabilized.

Since the vertical tail fin passing gap that permits the vertical tail fin of an aircraft to pass when carrying the aircraft into or out of the building is formed in the middle part of each of the current deflecting members, and the vertical tail fin passing gap is covered with a removable cover, the covers are moved away from the vertical tail fin passing gaps to open the vertical tail fin passing gaps so that the vertical tail fin is able to pass through the vertical tail fin passing gaps and the aircraft can be carried into or out of the building even if the lower edges of the current deflecting members are at a level below that of the tip of the vertical tail fin. The vertical tail fin passing gaps are closed by covering the same with the covers during run-up to achieve the deflection of air currents without being affected by the vertical tail fin passing gaps.

The pair of current-straightening plates are disposed at the opposite ends of the vertical tail fin passing gap of each current deflecting member so as to extend forward and vertically reduce the swirling or turbulent flow of air at edges defining the vertical tail fin passing gap of each current deflecting member.

Since the wind guard structure has an open-area ratio in the range of 50% to 75%, the wind guard structure maintains a low resistance against the passage of air currents and exercises a satisfactory protective function against wind.

The wind guard structure having a mean height of 2.0 m or above exercises a satisfactory protective function against wind.

Since the air-permeable, upper wind guard is disposed on the upper end of the wind guard structure at a level substantially equal to that of the upper end of the wind guard structure so as to cover the upper end of the air inlet structure, the effect of wind and wind direction on air currents flowing therethrough into the air inlet structure can be reduced and the distribution of velocities of the air currents in the entire region of the air passage of the air inlet structure can be uniformed.

The current-straightening structure formed in a predetermined length with respect to the flowing direction of air has a satisfactory current-straightening ability.

Since the plates of the current-straightening structure are formed of a sound absorbing material, the current-straightening structure is capable of effectively absorbing run-up noise generated in the building.

The first current-straightening member is simple in construction and is capable of exercising a current-straightening ability without exerting an excessive resistance on air currents.

The second current-straightening member is simple in construction and is capable of exercising a current-straightening ability without exerting an excessive resistance on air currents.

The third current-straightening member is simple in construction and is capable of exercising a current-straightening ability without exerting an excessive resistance on air currents.

The fourth current-straightening member is simple in construction and is capable of exercising a current-straightening ability without exerting an excessive resistance on air currents.

Although the invention has been described in its preferred embodiments with a certain degree of particularity, it is obvious to those skilled in the art that many changes and variations are possible therein. It is therefore to be understood that the present invention may be practiced otherwise than as specifically described herein without departing from the scope and spirit thereof.

What is claimed is:

1. An aircraft engine run-up hangar comprising:
    a building defining a test chamber capable of receiving an aircraft therein;
    an air inlet structure; and
    an exhaust structure;
    wherein the air inlet structure is formed in a front end part of a roof structure corresponding to a front end part of the building,
    the exhaust structure is connected to a rear end part of the building and defines an exhaust passage extending obliquely upward from the back end of the building, and
    one or a plurality of current deflecting members are disposed near a lower end of the air inlet structure to deflect air currents flowing through the air inlet structure into the building toward an aircraft housed in the building.

2. The aircraft engine run-up hangar according to claim 1 further comprising an air-permeable wind guard structure rising from the roof structure of the building and surrounding the air inlet of the air inlet structure.

3. The aircraft engine run-up hangar according to claim 1, wherein the air inlet structure is provided with a current-straightening structure provided with a plurality of plates arranged in a grid or a honeycomb so as to define vertical current-straightening passages.

4. The aircraft engine run-up hangar according to claim 3, wherein a first current-straightening member is disposed at the lower end of the current-straightening structure.

5. The aircraft engine run-up hangar according to claim 3, wherein a current-straightening space of a predetermined height is formed under the current-straightening structure in a region below the current deflecting member or members, and a second current-straightening member is disposed in a lower end part of the current-straightening space.

6. The aircraft engine run-up hangar according to claim 5, a plurality of third current-straightening members are disposed vertically in the current-straightening space so as to extend in the direction of the air currents.

7. The aircraft engine run-up hangar according to claim 1, wherein the air inlet structure is disposed at a position on the front end part of the roof structure of the building corresponding to a position in front of the aircraft housed in the building.

8. The aircraft engine run-up hangar according to claim 1, wherein an air inlet of the air inlet structure has a width nearly equal to the width of a front end part of the building.

9. The aircraft engine run-up hangar according to claim 1, wherein the one or the plurality of current deflecting members are plates having a substantially J-shaped cross section.

10. The aircraft engine run-up hangar according to claim 1, wherein the one or the plurality of current deflecting members are plates having a substantially J-shaped cross section, and the current deflecting member or members are disposed in a region around a position at a distance equal to 3/14 to 3/7 of a length of the air inlet structure from a back end of the air inlet structure.

11. The aircraft engine run-up hangar according to claim 10, wherein a fourth current-straightening member is extended from a position near the lower end of the current deflecting member to a ceiling included in the building on the back side of the current deflecting members.

12. The aircraft engine run-up hangar according to claim 10, wherein the current deflecting member having the substantially J-shaped cross section is provided with one or a plurality of flaps.

13. The aircraft engine run-up hangar according to claim 1, wherein the plurality of current deflecting members are formed integrally with lower edge parts of a plurality of plates extended laterally in the current-straightening structure, respectively.

14. The aircraft engine run-up hangar according to claim 1, wherein the plurality of current deflecting members comprise a plurality of guide members arranged at predetermined longitudinal intervals.

15. The aircraft engine run-up hangar according to claim 14, wherein the plurality of guide members extend downward such that lower edges of the guide members nearer to a front end of the building are at lower levels.

16. The aircraft engine run-up hangar according to claim 10, wherein a vertical tail fin passing gap that permits a vertical tail fin of an aircraft to pass when carrying the aircraft into or out of the building is formed in a middle part of each of the current deflecting members, and the vertical tail fin passing gap is covered with a movable cover.

17. The aircraft engine run-up hangar according to claim 10, wherein a vertical tail fin passing gap is formed in a middle part of each current deflecting member, and a pair of vertical current-straightening plates are disposed at opposite ends of the vertical tail fin passing gap of each current deflecting member so as to extend longitudinally.

18. The aircraft engine run-up hangar according to claim 2, wherein the wind guard structure has an open-area ratio in the range of 50% to 75%.

19. The aircraft engine run-up hangar according to claim 2, wherein the wind guard structure has a mean height of 2.0 m or above.

20. The aircraft engine run-up hangar according to claim 2, wherein an upper wind guard is disposed on an upper end of the wind guard structure at a level substantially equal to that of the upper end of the wind guard structure so as to cover the upper end of the air inlet structure.

21. The aircraft engine run-up hangar according to claim 3, wherein the current-straightening structure is formed in a predetermined length with respect to the flowing direction of air.

22. The aircraft engine run-up hangar according to claim 3, wherein the plates of the current-straightening structure are formed of a sound absorbing material.

23. The aircraft engine run-up hangar according to claim 4, wherein the first current-straightening member is formed from a metal net, a textile net, a perforated plate, a slit plate or an expanded metal, and has an open-area ratio in the range of 40% to 70%.

24. The aircraft engine run-up hangar according to claim 5, wherein the second current-straightening member is formed from a metal net, a textile net, a perforated plate, a slit plate or an expanded metal.

25. The aircraft engine run-up hangar according to claim 6, wherein the third current-straightening member is formed from a metal net, a textile net, a perforated plate, a slit plate or an expanded metal.

26. The aircraft engine run-up hangar according to claim 11, wherein the fourth current-straightening member is formed from a metal net, a textile net, a perforated plate, a slit plate or an expanded metal.

* * * * *